(12) United States Patent
Collier et al.

(10) Patent No.: US 9,734,527 B2
(45) Date of Patent: Aug. 15, 2017

(54) VISUAL SHOPPING

(71) Applicant: NIKE, Inc., Beaverton, OR (US)

(72) Inventors: Michael David Collier, Lake Oswego, OR (US); Byron George Merritt, Portland, OR (US); Esther S. Chang, Portland, OR (US); Joshua A. Moore, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/155,774

(22) Filed: Jan. 15, 2014

(65) Prior Publication Data

US 2014/0201024 A1    Jul. 17, 2014

Related U.S. Application Data

(60) Provisional application No. 61/753,765, filed on Jan. 17, 2013, provisional application No. 61/753,797, filed on Jan. 17, 2013.

(51) Int. Cl.
*G06Q 30/00* (2012.01)
*G06Q 30/06* (2012.01)

(52) U.S. Cl.
CPC ......... *G06Q 30/0621* (2013.01); *G06Q 30/06* (2013.01); *G06Q 30/0601* (2013.01);
(Continued)

(58) Field of Classification Search
CPC .............................................. G06Q 30/0621
(Continued)

(56) References Cited

U.S. PATENT DOCUMENTS

| 2003/0033207 A1 | 2/2003 | Litke et al. |
| 2004/0181804 A1* | 9/2004 | Billmaier .............. G06F 3/0482 |
| | | 725/39 |

(Continued)

FOREIGN PATENT DOCUMENTS

| JP | 2012108806 A | 6/2012 |
| JP | 2012532379 A | 12/2012 |

(Continued)

OTHER PUBLICATIONS

Lee, Hyun-Hwa, Chang, Eunyoung, Consumer Attitudes Toward Online Mass Customization: An Application of Extended Technology Acceptance Model, Jan. 13, 2011, Journal of Computer-Mediated Communication, vol. 16, Issue 2, pp. 171-200.*

(Continued)

*Primary Examiner* — Resha Desai
*Assistant Examiner* — Lindsey Smith
(74) *Attorney, Agent, or Firm* — Banner & Witcoff, Ltd.

(57) ABSTRACT

Systems and methods are provided for customizing consumer products. A display device may present a rendering of a customizable product to a user. The display device may also present a set of customizations on a scrollable axis. An input interface such as a touch interface may receive a selection of at least one customization from the user, and the rendering of the product may be updated to display the customizations selected by the user. An electronic file may be generated that includes product manufacturing details, which indicate the customizations selected by the user. The product may be an article of footwear, and a printer may print the selected customizations on the article of footwear.

20 Claims, 23 Drawing Sheets

(52) U.S. Cl.
 CPC ..... *G06Q 30/0623* (2013.01); *G06Q 30/0635* (2013.01); *G06Q 30/0641* (2013.01); *G06Q 30/0643* (2013.01); *G06Q 30/0603* (2013.01)

(58) Field of Classification Search
 USPC .............................................. 705/26.1–27.2
 See application file for complete search history.

(56) References Cited

U.S. PATENT DOCUMENTS

| | | | |
|---|---|---|---|
| 2005/0154988 A1* | 7/2005 | Proehl et al. | 715/720 |
| 2008/0126981 A1* | 5/2008 | Candrian et al. | 715/810 |
| 2010/0235258 A1* | 9/2010 | Langvin | A43B 5/001 705/26.1 |
| 2010/0318442 A1* | 12/2010 | Paul et al. | 705/26.5 |
| 2012/0221428 A1 | 8/2012 | Harvill et al. | |
| 2012/0239535 A1* | 9/2012 | Leal | 705/26.64 |
| 2012/0253968 A1* | 10/2012 | Cok et al. | 705/26.5 |

FOREIGN PATENT DOCUMENTS

| | | | | |
|---|---|---|---|---|
| KR | 20070108176 A | 11/2007 | | |
| KR | 20080067498 A | 7/2008 | | |
| KR | 20100007572 A | 1/2010 | | |
| KR | 20110058834 A | 6/2011 | | |
| KR | 20120029427 A | 3/2012 | | |
| WO | WO 0188824 A2 * | 11/2001 | | G06F 17/60 |
| WO | 2011002787 A1 | 1/2011 | | |

OTHER PUBLICATIONS

Jul. 11, 2014 (WO) ISR—App. No. PCT/US14/11630.
Jul. 14, 2016—(EP) Extended Search Report—App. No. 14703976.2.

* cited by examiner

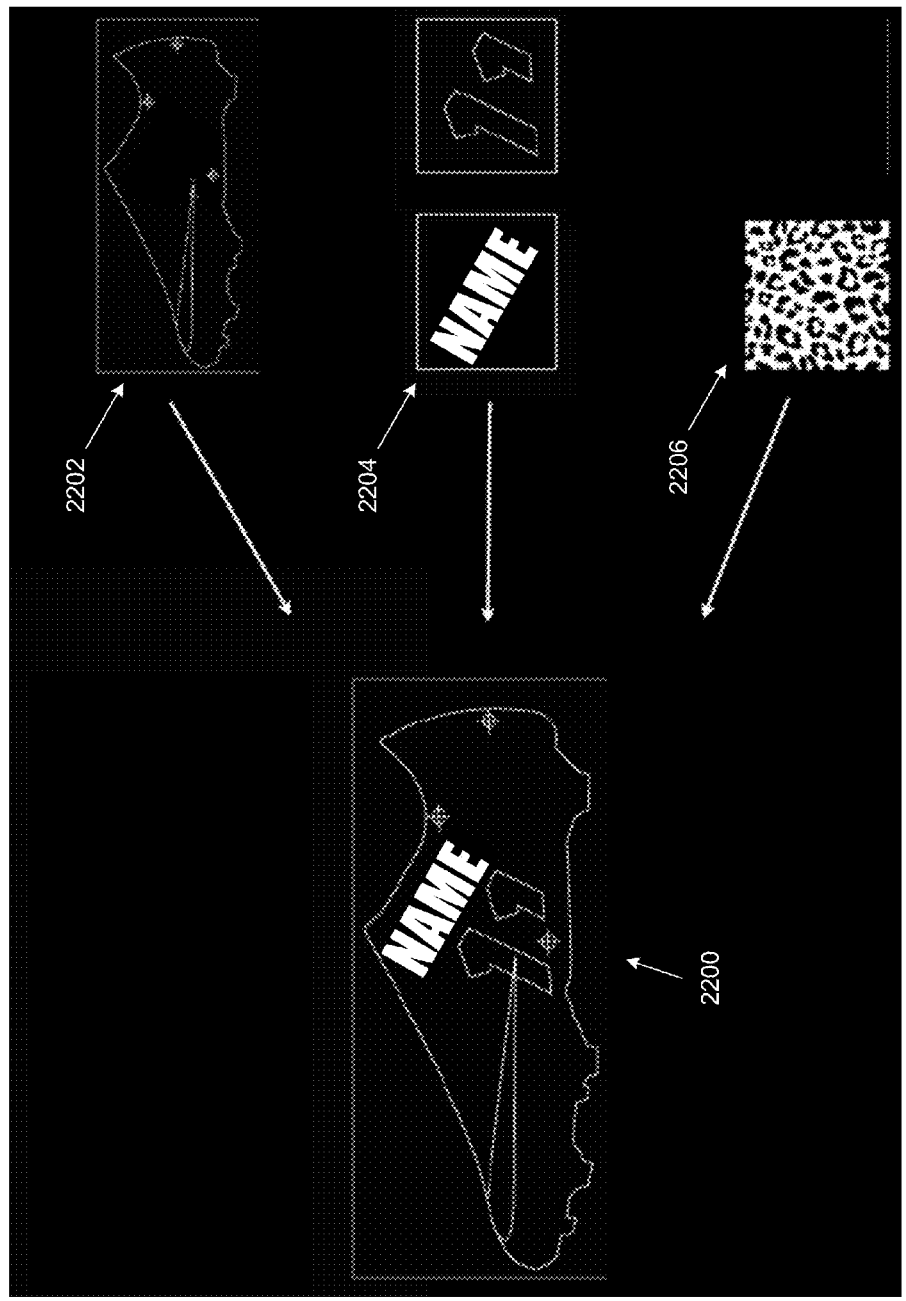

VISUAL SHOPPING

CROSS-REFERENCE TO RELATED APPLICATIONS

This applications claims the benefit of U.S. Provisional Application No. 61/753,797 entitled "Visual Shopping" and filed on Jan. 17, 2013 as well as U.S. Provisional Application No. 61/753,765 entitled "Visual Shopping" and filed on Jan. 17, 2013, each of which are incorporated by reference in their entirety in this application.

FIELD OF THE INVENTION

The present disclosure relates to systems, methods, and computer generated user interfaces for design of (e.g., customization of) consumer products, such as articles of footwear, articles of apparel, athletic equipment (e.g., bags, gloves, watches, socks, uniforms, protective equipment, pads, team gear, etc.).

BACKGROUND

Recent years have ushered in advancements in printing technologies and there capabilities including manufacturing of customized products in a very short amount of time. While advances have been made, certain drawbacks still remain in user selection of products to be customized. The present provides advances in the design and onsite delivery of customized consumer products.

BRIEF SUMMARY

Various aspects of this disclosure relate to systems and methods for designing (e.g., customization of consumer products, such as articles of footwear by users. Various users may at a store location design and customize products which can be manufactured and delivered to the user during the same shopping visit.

Additional aspects of this disclosure relate to user interfaces provided on computing devices that allow users to design consumer products, such as articles of footwear. The computing device may generate a user interface that displays a rendering of the product being customized. The user interfaces are generated by computer readable media including computer executable instructions stored thereon for generating a desired user interface on a display device, wherein the computer executable instructions provide systems and methods and accept users' input for product (e.g., footwear) design.

In particular, a first aspect described herein provides a method for customizing consumer products. A display device may present a rendering of a customizable product to a user. The display device may also present a set of customizations on a scrollable axis. A touch interface may receive a selection of at least one customization from the user, and the rendering of the product may be updated to display the customizations selected by the user. An electronic file may be generated that includes product manufacturing details, which indicate the customizations selected by the user.

A second aspect described herein provides a system for customizing consumer products. A display device presents a rendering of a customizable product and a set of customizations to a user. The set of customizations may be presented on a scrollable axis. An input interface may receive a selection of at least one customization from the user. A customization server may update the rendering of the product to display the customizations selected by the user. An electronic file may have product manufacturing information details that indicate the customizations selected by the user.

While described above in conjunction with articles of footwear, aspects of this invention also may be practiced in conjunction with design of other products, such as apparel (including athletic apparel, uniforms, etc.) and athletic equipment (such as balls, bats, gloves, bags, protective equipment, team gear, pads, hockey sticks, watches, socks, etc.).

BRIEF DESCRIPTION OF THE DRAWINGS

The above-noted and other features and aspects of the invention will become more apparent from the following detailed description, when considered in conjunction with the appended drawings.

FIG. 22 illustrates a representation of exemplary manufacturing information corresponding to exemplary customizations selected by a user for an article of footwear.

DETAILED DESCRIPTION

Figure 1A:
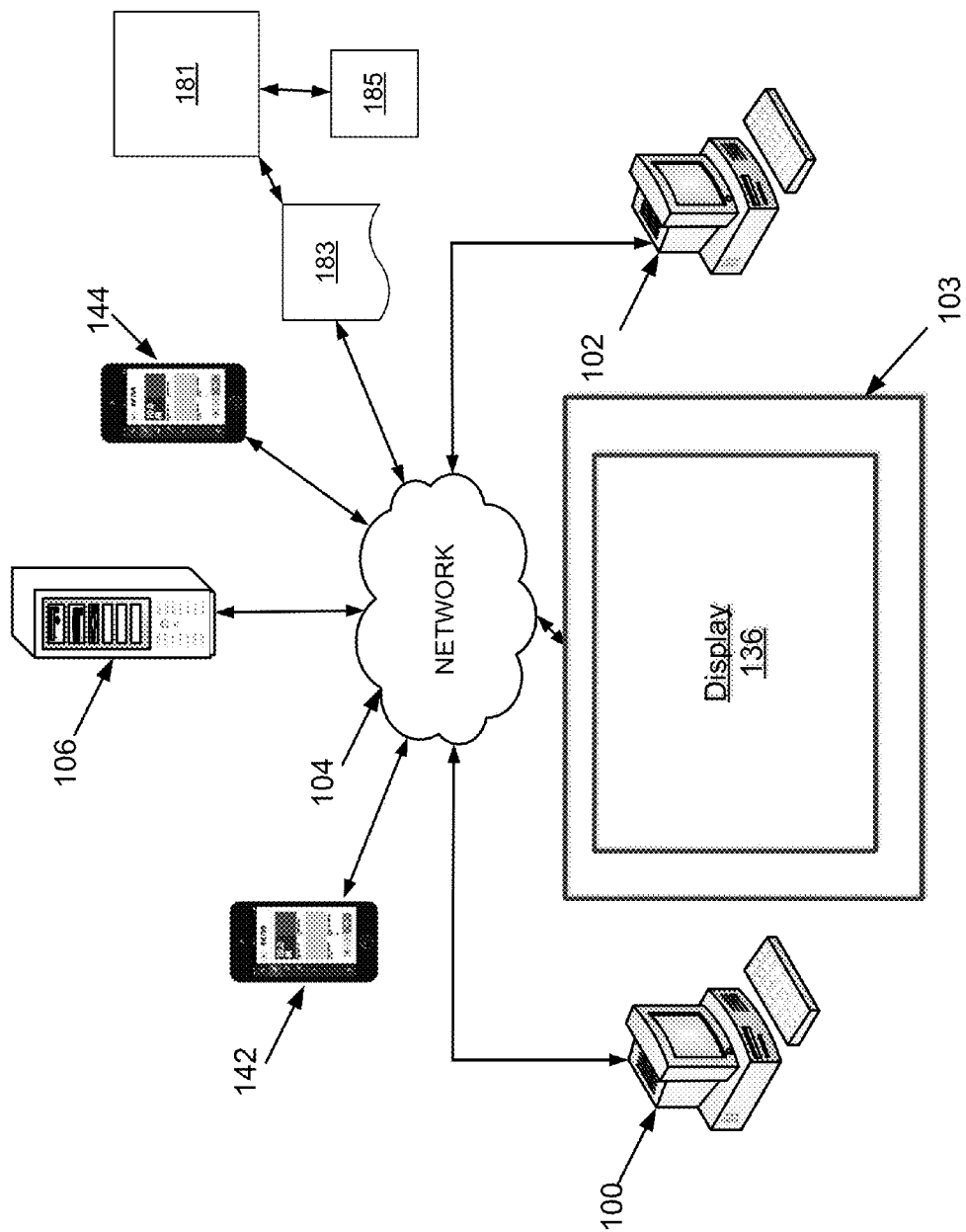
FIGS. 1A and 1B illustrate various examples of hardware and overall networking systems that may be used in accordance with various aspects of the disclosure.

In general, as described above, some aspects of this disclosure relate to systems and methods for designing consumer products, such as articles of footwear, apparel, and/or athletic equipment.

In an aspect of the disclosure, any desired type of apparel or athletic equipment design data may be modified, altered, or customized. For instance, any desired type of footwear design data may be controlled, altered, or customized by a user of systems and methods according to this disclosure, such as: a color of a portion of the article of footwear (e.g., the various upper portions or elements, the various midsole portions or elements, the various outsole portions or elements, etc.); pictorial, indicia, or other graphical data that may be printed or otherwise provided on the shoe, including the picture, indicia, or graphical data itself (i.e., so the picture, indicia, or graphic can be generated), as well as data identifying the desired location for the picture, indicia, or graphic on the shoe, the picture, indicia, or graphic size, the picture, indicia, or graphic orientation, etc.; logo data that may be provided on the shoe (e.g., the footwear manufacturer's logo, a team or group logo, etc.), including the logo data itself (i.e., so the logo can be generated), as well as data identifying the desired logo location on the shoe, the desired logo size, the desired logo color(s), the desired logo orientation, etc.; textual data that may be provided on the shoe, including the textual data itself (i.e., so the text can be generated), as well as data identifying the desired text location, the desired text size, the desired text color, the desired text orientation, the desired text font, etc. In addition, additional features such as shoe lace color may also be customized by the user.

In an aspect of the disclosure, a graphic element may be placed on a shoe structure, such as a picture, graph, icon, avatar, clip art, or other graphic element. If desired, systems, methods, and user interfaces in accordance with examples of this disclosure also may allow the user to drag the graphic around (e.g., using a pointer device) to aid in positioning or orienting the graphic with respect to the shoe structure. The graphic may be applied to any desired portion of the shoe structure being designed, such as the upper, the midsole, the outsole, the interior bootie, the tongue element (top side or underside), etc., and even to multiple parts of the shoe, if desired.

While described below in conjunction with design of articles of footwear, aspects of this invention also may be used for design of other consumer products, such as articles of apparel, athletic equipment, etc. In the footwear example, a user may be permitted to select various features of the footwear and manipulate the visual image of the footwear on a display device via an interface at a store location or other physical location.

The user interface may display one or more tools for changing aspects of or otherwise manipulating various design data of the footwear. In an aspect of the disclosure, a tool for quickly scanning, and making a selection, or choice, is disclosed. In an embodiment, the tool provides the ability to see an array of options and quickly narrow down those options to facilitate and enable choices for a user.

Some design tools may include features like a lace color palette or lace color menu that allows users to change lace color of the article of footwear; one or more orientation elements that allow users to change an orientation of the article of footwear as rendered in the first display portion; or other design features of the article of footwear such as color of the various portions of the footwear.

FIG. 1A illustrates an exemplary hardware system on which various user interfaces according to this disclosure may be implemented and on which methods according to this invention may be practiced. FIG. 1A shows a first computing device 100, a second computing device 102, and a third computing device 103 connected and in communication with one another via a network 104, such as via an internet connection, via a local area network (LAN), via a wide area network (WAN), etc. The computing devices 100, 102, and 103 may be located remotely from one another. Each computing device may include a display such as touch display 136 of computing device 103.

As shown in FIG. 1A, the computing devices 100, 102, and 103 each establish a communication channel within the network 104 and communicate with a customization server system 106 (comprising one or more server computers) that provide data used to change the design (as will be described in more detail below). Any desired communication link and communication protocol may be used to provide and control the data exchange between computing devices 100, 102, and 103.

Any desired types of computing devices 100, 102, and 103 may be used without departing from this disclosure, such as any computing device capable of establishing a networked connection and/or a peer-to-peer connection and capable of providing the necessary display, user interface, and input capabilities, as will be described in more detail below. Some more specific examples of computing devices 100, 102, and 103 that may be used in systems and methods in accordance with at least some examples of this invention include, but are not limited to: desktop computers, personal computers, laptop computers, palmtop computers, handheld computers, cellular telephones, personal digital assistants, computer workstations, televisions, and the like. For instance, FIG. 1A also illustrates two handheld computing devices such as smart phones 142 and 144 which may be used to communicate with customization server 106. In an embodiment, smart phone 142 may be a user's smart phone and smartphone 144 may belong to store associate (e.g., a "Nike Athlete").

The computing devices 100, 102, 103, 142, and 144 may be connected to the network 104 in any desired manner without departing from this disclosure, including in conventional manners that are known and used in the art, such as any conventional wired or wireless connection and using any network connection protocol. In addition the computing devices 100, 102, 103, 142, and 144 may be capable of communication among each other or with customization server 106 via an instant messaging channel, a peer-to-peer messaging channel, a conventional telephone connection (which may use different hardware from that involved in inputting and exchanging the collaboration data), etc. As another alternative, if desired, the users could be located in close proximity to one another and may be allowed to communicate directly, in a face-to-face conversation, without the need for a separate communication channel.

As will be described in more detail below, systems and methods in accordance with examples of this disclosure will provide a user interface display on computing devices 100, 102, 103, 142, and 144. This interface may allow the user to see and introduce his/her input into a product in order to customize the product.

The user interfaces on the various devices may be provided and controlled by one or more of the computing devices 100, 102, 103, 142, 144 and/or by the customization server system 106, and data for generating, maintaining, and receiving input through the user interfaces may be generated and provided via computer readable media included as part of or associated with one or more of the computing devices and/or the server system 106. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts.

Customizing the product may include printing the customizations selected by the user onto the product. The customization server 106 may thus be capable of communication with a printer 181 via the network 104. The customization server 106 may transmit a message to the printer 181 that includes an electronic file 183 having product manufacturing details that indicate customizations selected for the product. the printer may be configured to print the customizations selected by the user on the product to produce a customized product 185. As noted above, the product may be, for example, an article of footwear. The printer 183 may thus be configured to print customizations on an article of footwear to produce a customized article of footwear. Various customizations of the product will be discussed in further detail below.

Figure 1B:
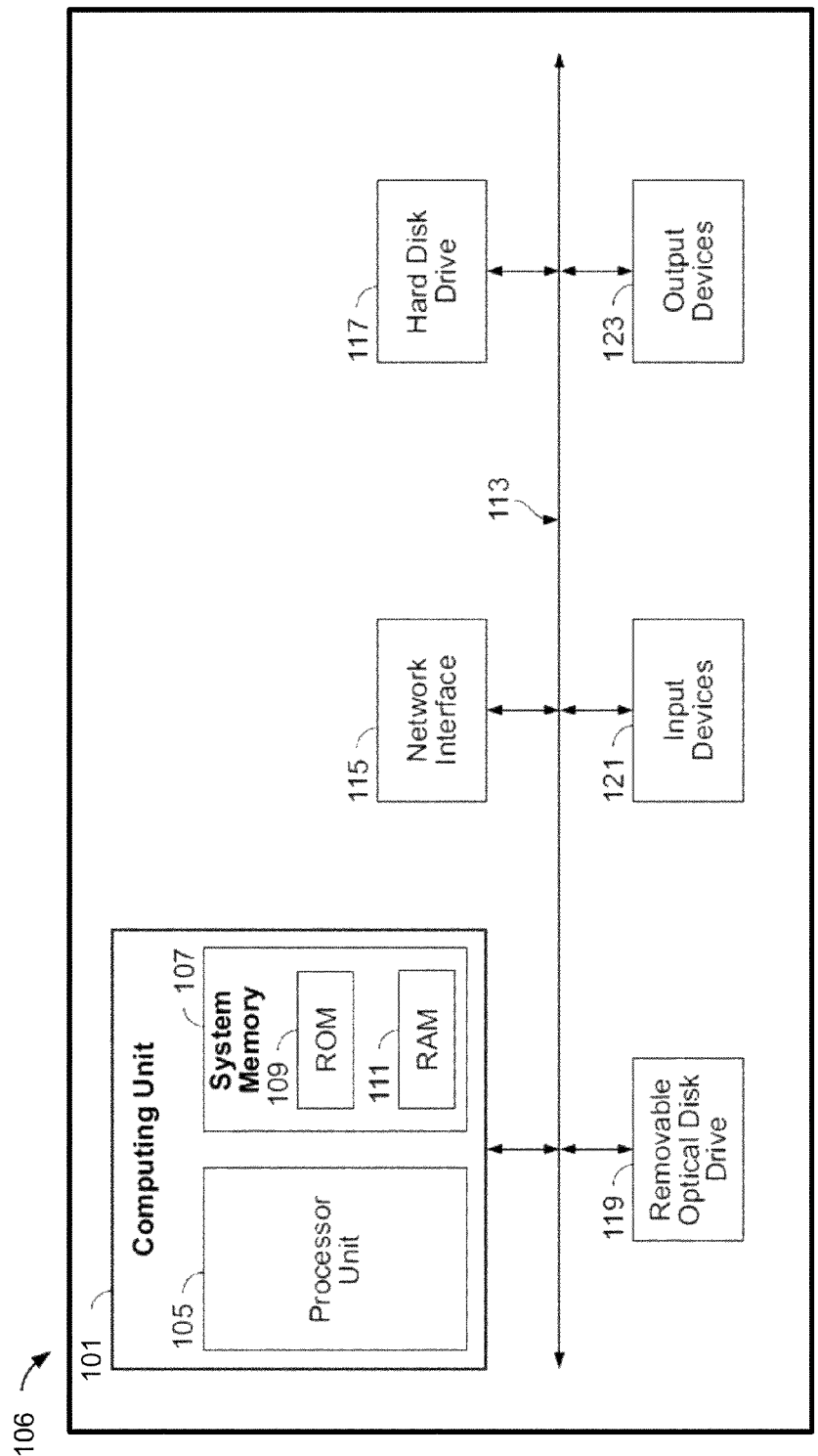

Turning briefly to FIG. 1B, customization server 106 may include computing unit 101, which may comprise at least one processing unit 105. Processing unit 105 may be any type of processing device for executing software instructions, such as for example, a microprocessor device. Customization server 106 may include a variety of non-transitory computer readable media, such as memory 107. Memory 107 may include, but is not limited to, random access memory (RAM) such as RAM 111, and/or read only memory (ROM), such as ROM 109. Memory 107 may include any of: electronically erasable programmable read only memory (EEPROM), flash memory or other memory technology, CD-ROM, digital versatile disks (DVD) or other optical disk storage, magnetic storage devices, or any other medium that can be used to store the desired information and that can be accessed by customization server 106.

The processing unit 105 and the system memory 107 may be connected, either directly or indirectly, through a bus 113 or alternate communication structure to one or more peripheral devices. For example, the processing unit 105 or the system memory 107 may be directly or indirectly connected to additional memory storage, such as a hard disk drive 117, a removable magnetic disk drive, an optical disk drive 119, and a flash memory card. The processing unit 105 and the system memory 107 also may be directly or indirectly connected to one or more input devices 121 and one or more output devices 123. The output devices 123 may include, for example, a display device, television, printer, stereo, or speakers. The input devices 121 may include, for example, a keyboard, touch screen, a remote control pad, a pointing device (such as a mouse, touchpad, stylus, trackball, or joystick), a scanner, a camera or a microphone. In this regard, input devices 121 may comprise one or more sensors configured to sense, detect, and/or measure athletic movement from a user.

Given this general background and information, more detailed information regarding specific examples of systems, methods, computer-readable media, and user interfaces in accordance with this invention will be described in more detail below. Computer-readable media, as used in this description, refers to all computer-readable media with the sole exception being a transitory propagating signal. It should be understood that this more detailed description relates to various specific examples of the disclosure and their features and functionality, and this description should not be construed as limiting the disclosure.

Various features of product design systems, methods, and user interfaces (e.g., generated by a computing device for accepting user input and providing a user with information regarding the design) will be described in more detail below. Those skilled in the art will appreciate that the following description and the attached drawings merely represent examples of potential features, functionality, arrangement of interface components, orientation of interface components, combinations of interface components, and the like, of systems, methods, and user interfaces in accordance with this invention.

In an aspect of the disclosure, a user may enter a store to purchase product, such as an article of footwear (e.g., a running shoe). The user may approach a store display which enables a user to select among physical products (e.g., running shoes), but also provide the customer with a mechanism to select among certain, supported products, for the purposes of customizing or semi-customizing various features of the selected, supported products (e.g., a running shoe). Henceforth, example embodiments are described in many cases with respect to shoes, but cover other products.

Figure 2:
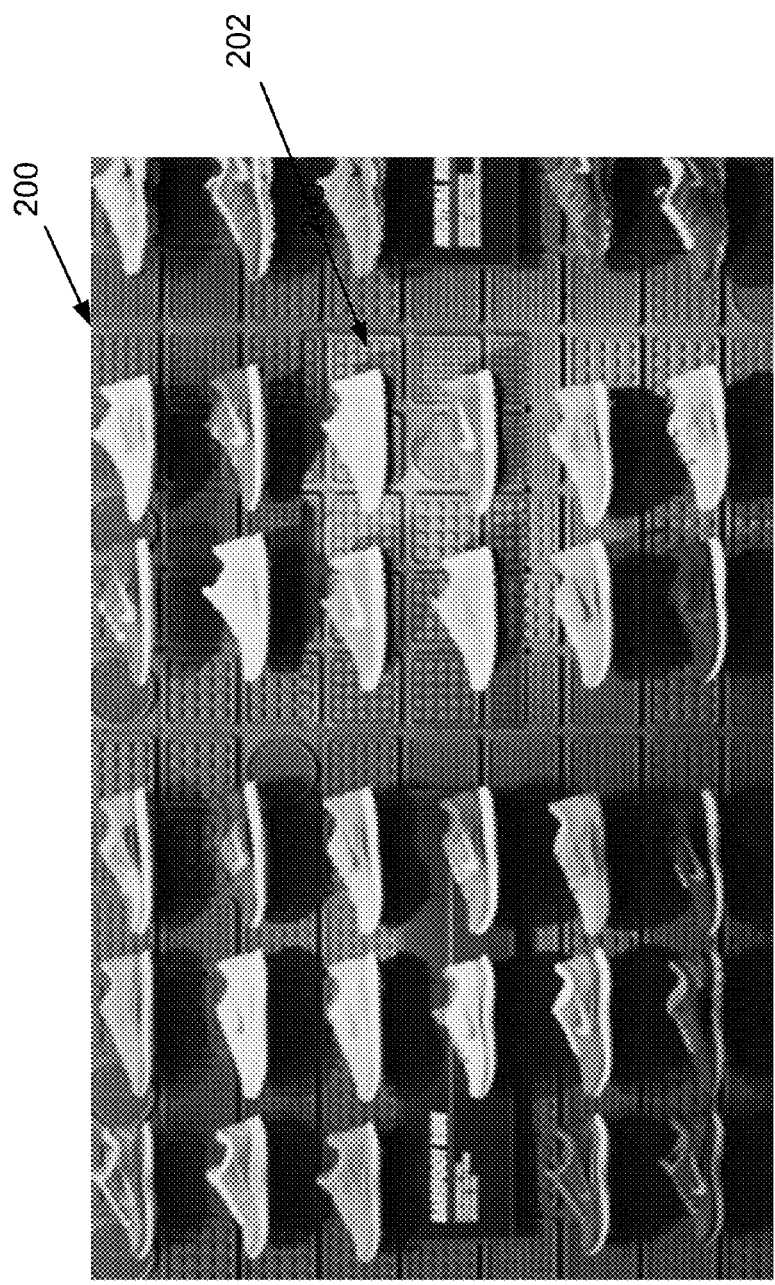
FIG. 2 illustrates an exemplary store display which may be used in accordance with various aspects of the disclosure.

For instance, FIG. 2 illustrates a store display 200 with a display device 202 embedded within store display 200. Display device 202 may be utilized to show images of products (e.g., shoes) which imaged products are similar to the products physically displayed in store display 200. Display device 202 may provide a graphical user interface which includes a touch interface for receiving inputs or gestures from a user of display device 202.

In an aspect of the disclosure, display device 202 may be operated in many different modes. The modes may be triggered by different actions such as proximity to display device 202, voice recognition, touch activation, etc.

In an aspect of the disclosure, display device 202 may include an illusion screen mode. The illusion screen mode may include colored images having shadows, perspectives and other imagery, so as to enable display device 202 to substantially blend with the physical store display 200 (or wall) which borders display device 202. For instance, the illusion screen mode of display device 202 may include shoes and background images, in colors, shadows, perspectives and other imagery, so as to enable the display device to substantially blend with the physical wall and shoes thereon which border the display device. In an aspect of the disclosure, display device 202 in the illusion mode may show shadows on the user interface screen to represent shadows cast from the physically located shoes located along the display device's upper portion and side portions. Such shadowing displayed on display device 202 assists in making display device 202 blend with surrounding store display 200. In an embodiment shown in FIG. 2, shoe images shown on display device 202 may be the same or similar in size to the physical shoes displayed in store display 200 to further assist in blending display device 202 with store display 200. In an embodiment, the illusion screen mode may be a default mode until a different mode is triggered and/or activated.

In an aspect of the invention, display device 202 may also have an attraction mode. In the attraction mode, images of products may be shown being customized in one or more ways, including via colors, at first slowly and then more quickly, and so on, ultimately with a splash screen to announce the functionality supported by the display. In an embodiment, display device 202 when in the attraction mode may show various videos or product materials to attract new users or draw additional attention to store display 200 and/or to the display device 202. Such an attraction feature may be initiated on a predetermined interval or based on user proximity to store display 200 and/or to the display device 202.

In another aspect of the invention, display device 202 may also have an application mode which may be activated automatically or by a user or sales associate for product customization. In an embodiment, in the application mode the user interface screens may use the same background. In another embodiment, the user interface screen in the application mode may use a different background, e.g., a monochrome, graphic-less screen.

In embodiments in which the background image mimics the store display's wall, the background image's graphics may be retained, but become a particular color, e.g., white, that is selectively distinct from the wall. In other embodiments, the background image's graphics may be changed, e.g., to become faded, with or without a change in color to further contrast and show user changes to the displayed customized or semi-customized product.

In an aspect of the disclosure, store display 200 illustrates various shoes (or shoe styles) that may be customized or semi-customized in a store by a user. In an embodiment, a user selects a shoe style for customization or semi-customization among the supported shoes. For instance, the user may select a particular style of running shoe. The selection of the shoe style may be made among the supported shoes by touching a style of shoe shown on the displayed user interface. After a user provides their selected customizations, the selected shoe may be customized or semi-customized in the backroom of a store while the consumer waits or continues to shop. While waiting the user may wish to visit various websites related to the product or a website discussing customization of products (i.e., NIKEiD).

Figure 3:
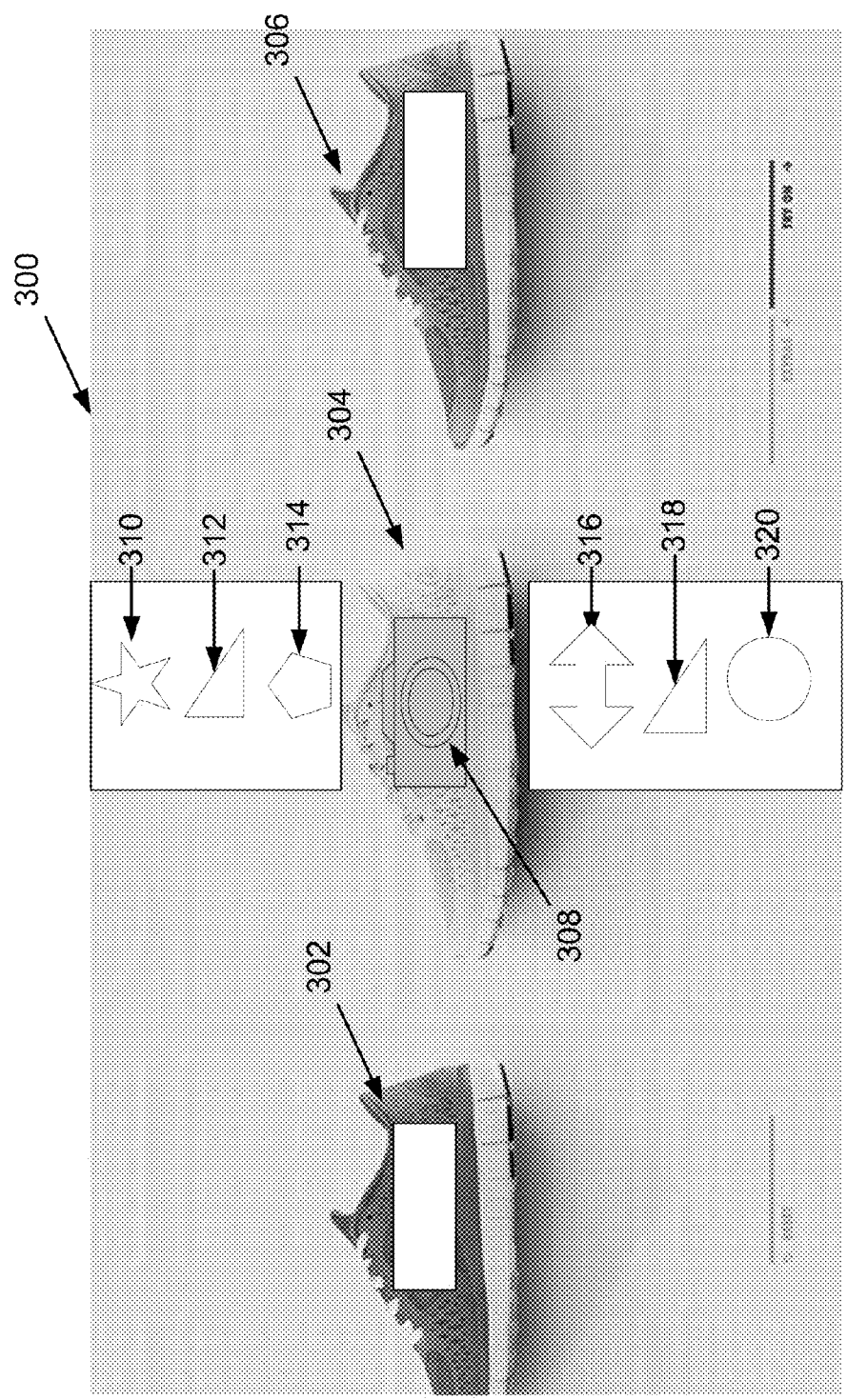
FIG. 3 illustrates an exemplary user interface screen through which product customization functionality may be used in accordance with various aspects of the disclosure.

FIG. 3 illustrates an example of a user interface response that might take place as a result of initiation of a product customization system and method. In this illustrated example, the user interface shows various shoes that may be selected by a user for customization or semi-customization. In an embodiment, upon initiation of product customization, the background image of various user interfaces may be changed i.e. application mode.

In an embodiment, once a shoe style is selected by the user or the system, customization or semi-customization of the selected shoe style may be initiated by the user. For instance, as shown in FIG. 3, a user may select among various shoe colorways by applying a swipe gesture (e.g., swiping a finger on, along or otherwise in an association with the touch interface) horizontally across (i.e., left and/or right) the user interface 300. In some embodiments, this horizontal swipe gesture may be initiated by touching and translating that touch starting from any location of the touch interface; in other embodiments, this horizontal swipe gesture may be initiated by touching and translating that touch starting from and/or in restricted locations, regions, quadrants, or locational constraints associated with the touch interface. In an illustrative example, as a user moves their finger horizontally across user interface 300, different colored shoe images 302, 304, and 306 move along a horizontal axis so that a shoe color of choice may be selected. The different colored shoes may be arranged in a predetermined color palette such that various shades or variations in each color may be displayed in a systematic pattern, e.g., so as to make it easier for a user to visualize the differences in shoe colors.

In the example shown in FIG. 3, three shoe images are shown; in other embodiments, other numbers of shoe images may be shown at any one time. Those skilled in the art will realize that the number of colored shoes displayed in the horizontal axis may be altered based on various factors such as display screen size. Shoe images shown at any instant may be moved aside so as to reveal other shoe images, such function being provided by swiping in either/both horizontal directions. Repeated swiping in any one or the other horizontal direction may exhaust the available shoe images; that is, the shoe images may be finite in number (e.g., the number of shoe images may be equal to or less than the number of commercial colorways offered as to the shoe style being displayed) and these images may be ordered in a logical row having two terminal shoe images, one terminal shoe image on a first end of the row and a second terminal shoe image on the other end of the row. In some embodiments, if the shoe images are exhausted by repeated swiping in one direction so as to reach one of the terminal images, the GUI may be configured to provide continued swiping in the same direction, so as to (i) reveal shoe images starting with the other terminal shoe and continuing revealing through the row of shoe images in the direction of the swipe gesture or (ii) to reveal shoe images in the reverse order that the images were previously revealed in reaching exhaustion.

In another aspect of the disclosure, as the user moves their finger horizontally across user interface 300 in selecting a shoe image, various indicia, pictures, or other symbols 308 may become positioned on the displayed shoe images. In one example embodiment, the various indicia, pictures, or other symbols 308 remain stationary in the GUI while the shoe images move responsive to and, typically, in the direction of the applied swipe gesture. The various indicia, pictures, or other symbols 308 may be shown in a consistent neutral color (e.g., white, grey, etc.) on each shoe image so as not to distract the user in selecting a shoe image, e.g., via the displayed colorways.

In another example, the various indicia, pictures, symbols, or other symbols 308 may be shown in respective, neutral colors on each displayed shoe image. In yet another example, one or more of the various indicia, pictures, or other symbols 308 may be shown in one or more non-neutral colors. Illustrations of this lattermost example are provided here, with reference to an example display of three shoe images wherein a single indicia is shown, which illustrations include the following: (i) a shoe resident in a predetermined position (e.g. centered) among the shoe images is shown in a non-neutral color of the user's selection, while the shoe images flanking that shoe are shown in a consistent, neutral color; (ii) a shoe resident in a predetermined position (e.g., centered) among the shoe images is shown in a first non-neutral color of the user's selection, while the shoe images flanking that shoe in one horizontal direction are shown in a second non-neutral color which second non-neutral color is a first distinct color of a configured or otherwise predetermined adjacency as to the first non-neutral color and the shoe images flanking that shoe in the other horizontal direction are shown in a third non-neutral color which third non-neutral color is a second distinct color of a configured or otherwise predetermined adjacency as to the first non-neutral color; and (iii) a shoe resident in a predetermined position among the shoe images is shown in a first non-neutral color of the user's selection, while the shoe images flanking that shoe in one horizontal direction are shown in a first set of non-neutral colors which first set comprises a first group of colors of a configured or otherwise predetermined adjacency as to the first non-neutral color and the shoe images flanking that shoe in the other horizontal direction are shown in a second set of non-neutral colors which colors comprise a second group of colors of a configured or otherwise predetermined adjacency as to the first non-neutral color.

In another embodiment, applying a tap gesture on (or within a configured or otherwise predetermined adjacency of) any shoe image not centered in the user interface may place the selected shoe image in the center of the user interface 300. That selected shoe image may be so placed, in an example, via the row of shoe images scrolling in one or the other horizontal direction, the scrolling ending (e.g., stopping abruptly, or slowing down until coming to a smooth stop) with the image placed in the center. That selected shoe image may be so placed, in another example, via the shoe images being re-registered, instantly or substantially instantly, so that the order of the images of the row is retained and the selected shoe image is placed in the center. That selected shoe image may be so placed via other mechanisms. In one or more of these examples, the selected shoe image is so centered, e.g., for further consideration or additional customizations by the user.

In another aspect of the disclosure, various indicia, pictures, symbols, or other graphics may be printed or otherwise provided on the shoe may also be displayed for selection. For instance, as shown in FIG. 3, a user may select a particular picture, indicia, or graphic represented by camera 308 shown on each of the colored shoe images 302, 304, and 306. Once the particular picture, indicia, symbol, or graphic has been chosen, various colors of the selected picture, indicia, symbol, or graphic may also be displayed on a vertical axis of user interface 300 for consideration and selection by the user.

As shown in FIG. 3, graphics 310, 312, 314, 308, 316, 318, and 320 may be displayed on a vertical axis. A user may select among these graphics by applying a swipe gesture (e.g., swiping a finger on, along or otherwise in an association with the touch interface) vertically across (i.e., up and/or down) the user interface 300. In some embodiments, this vertical swipe gesture may be initiated by touching and translating that touch starting from any location of the touch interface; in other embodiments, this horizontal swipe gesture may be initiated by touching and translating that touch starting from and/or in restricted locations, regions, quadrants, or locational constraints associated with the touch interface. As a user moves their finger vertically across the user interface 300, the different colored graphics 310, 312, 314, 308, 316, 318, and 320 move along the vertical axis so that a color graphic of choice may be selected.

In an example embodiment, the graphic of choice is selected by being placed at the center of the user interface. Being placed at the center of the user interface may implicate, in some embodiments, being placed in association with a selected shoe image, which selected shoe image is selected by being placed at the center of the user interface. In other embodiments, the selected graphic and shoe images may be placed in association with one another, at a position of the user interface other than the center. The graphics may be arranged in a predetermined color palette such that various shades or variations of each color may be displayed in a systematic way, e.g., so as to make it easier for a user to visualize the differences in the displayed colored graphics.

In the example shown in FIG. 3, seven graphics 310, 312, 314, 308, 316, 318, 320 are shown, which number includes the selected graphic 308 and, although not shown, each such graphic may be distinct from the others (e.g., based on color, pattern, shape, or other characteristic(s), including any combination); in other embodiments, other numbers of graphics may be shown at any one time. Those skilled in the art will realize that the number of graphics displayed in the vertical axis may be altered based on various factors, such as display screen size. Graphics shown at any instant may be moved so as to reveal other graphics, such function being provided by swiping in either/both vertical directions. Repeated swiping in any one or the other vertical direction may exhaust the available graphics. As an example, the graphics may be provided in a finite number of options (e.g., colors) and these graphics may be ordered in a logical column, the column having two terminal graphics, one terminal graphics at the top of the column and a second terminal graphics at the bottom of the column. In some embodiments, if the graphics are exhausted by repeated swiping in one direction so as to reach one of the terminal graphics, the GUI may be configured to provide continued swiping in the same direction, so as to (i) to reveal graphics starting with the other terminal graphics and continuing revealing through the column in the direction of the swipe gesture or (ii) to reveal graphics in the reverse order that the images were previously revealed in reaching exhaustion.

In example embodiments providing for the graphics to be moved in the user interface responsive to vertical swipe gestures, the graphics may or may not overlay a product image (e.g., the shoe image) as the graphics are moved up and/or down along the vertical axis. In some example embodiments implementing overlay, each of the graphics is moved to traverse a product image while maintaining the graphics over, in front of or otherwise visible with respect to the product image throughout the respective traverse (i.e., including, but not limited to, filling its proper position in the product image).

In other example embodiments implementing overlay, each of the graphics traversing the product image is transitioned to fill its proper position in the product image, either immediately upon any intersection with any portion of the shoe image or upon having achieved a configured or otherwise predetermined extend of overlay with the shoe image. In example embodiments that do not implement overlay, each of the graphics is moved so as to traverse a product image with the product image remaining over, in front of or otherwise visible with respect to each such graphics throughout its respective traverse. In such examples absent overly, each of the graphics may partially or fully disappear behind a product image until the respective graphic is shown in the graphic's proper position on the product. In some of these examples absent overlay, when it is determined that the graphic has traversed such that it would be shown (in whole or in part) as to its proper position of the product (such as at the origin 420 of FIG. 4), then the respective graphic is displayed fully in that position on the product. In others of these examples absent overlay, the graphic may be shown fully in its position as soon as a configured or otherwise predetermined portion of the graphic has disappeared behind the product image. In still others of these examples absent overlay, the graphic may be shown progressively in its proper position, e.g., in synchrony with the traversal of the product image. In still others of these examples absent overlay, this feature may be implemented otherwise toward ensuring that, as the graphics are being moved up and down vertically, the graphics do not obscure at all, or do not obscure beyond a configured or otherwise predetermined degree, the product image, e.g., in that the graphics are displayed when and/or to the extent aligned or otherwise associated in a selected manner with the graphic's proper position on the product image.

In another embodiment, applying a tap gesture on (or within a configured or otherwise predetermined adjacency of) any graphic not centered in the user interface may place the selected graphic on the centered shoe image (located at the origin 420) in the center of user interface 300, e.g., for further consideration or additional customizations by the user.

In another aspect of the disclosure, the horizontal indicia shown in FIG. 3 may be fixed while the vertical indicia may be color swatches, for which the color swatches "fill" the fixed indicia. As another alternative, the horizontal indicia may include a "customization area" (like a "green screen' but made of the material that enables the instant customization), with the vertical indicia being any variety of shapes, colors, patterns, etc. among which the user selects for realization within that customization area (but not necessarily fully "filling" that area).

Figure 4:
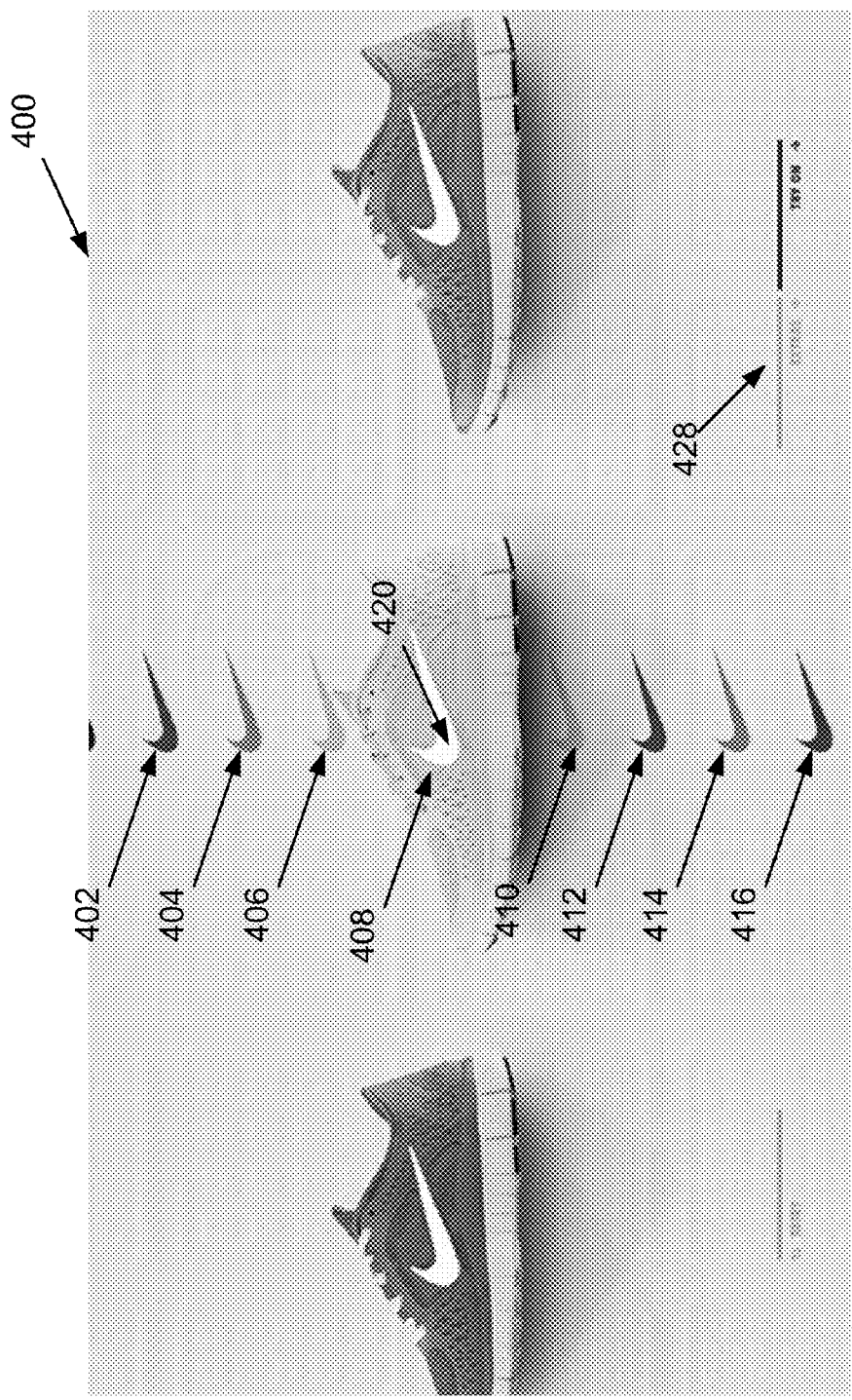
FIG. 4 illustrates another exemplary user interface screen through which product customization functionality may be used in accordance with various aspects of the disclosure.

FIG. 4 illustrates a user interface 400 which may be used in accordance with various embodiments of the disclosure. In FIG. 4, a user may select among colors for a footwear manufacturer's logo which may be placed on the selected colored shoe image, such shoe image being selected among various colorways for such shoe. In an example embodiment, the manufacture's logo may be the Nike® SWOOSH® as shown in FIG. 4. As illustrated in FIG. 4, a SWOOSH® may be shown in different colors such as SWOOSH® 402, 404, 406, 408, 410, 412, 414, and 416. SWOOSH® 402, 404, 406, 408, 410, 412, 414, and 416 may be displayed on a vertical axis. A user may select a SWOOSH® having a different color by swiping vertically across user interface 400. As a user so swipes (i.e., by moving their finger vertically up and down user interface 400), the display moves each different colored SWOOSH® 402, 404, 406, 408, 410, 412, 414, and 416 along the vertical axis so that a colored SWOOSH® may be selected, such selection being effected by the so selected SWOOSH® occupying the center of user interface 400. In some example embodiments, occupying the center of the user interface is shown by the selected SWOOSH® being placed in its proper position on the shoe being customized. In an embodiment, the speed of the user's swipe gesture may determine the speed at which SWOOSH® 402, 404, 406, 408, 410, 412, 414, and 416 are advanced along the vertical axis.

In some embodiments, the GUI may support one or more persistence characteristics as to the swipe gesture; that is, the SWOOSH® 402, 404, 406, 408, 410, 412, 414, and 416 may be continue to be advanced along the vertical axis after the swipe gesture has been completed (i.e., after the user ceases to swipe a finger on, along or otherwise in an association with the touch interface). As examples: (i) the persistence may be a function of the speed at disassociation, (ii) the persistence may be a function of acceleration/deceleration at disassociation (e.g., if disassociation is marked by an acceleration, the persistence may be characterized by the SWOOSH® advancing with that acceleration for a short, predetermined period and thereafter slowing based on equal deceleration to a stop), and/or (iii) the persistence may be a function of the swipe direction, shape or termination form, at or adjacent the disassociation (e.g., a horizontal swipe terminated with uplift may be associated with a selected persistence characteristic). In some embodiments, persistence will decay so that the advancement comes to a smooth stop, whereat some SWOOSH® occupies the center of the user interface.

In an embodiment, a white SWOOSH® may be placed on other shoe images shown in user interface 400 which are not being customized, e.g., so as not to distract from the product being customized or semi-customized and located at origin 420.

The different colored SWOOSH® 402, 404, 406, 408, 410, 412, 414, and 416 may be arranged in a predetermined color palette such that various shades or variations for each color may be displayed in a systematic way to make it easier for a user to visualize the differences in the shown colored SWOOSH®. Those skilled in the art will realize that the number of colored graphics displayed in the vertical axis may be altered based on the various factors such as display screen size and size of the SWOOSH®. As an example, a greater number of SWOOSH® may be shown than in the example of FIG. 4 by reducing the size of the SWOOSH® above and below the origin 420, while maintaining the proper size and position of the SWOOSH® with respect to the shoe image at the origin 420.

In an aspect of the disclosure, a user may select a different colored SWOOSH® by swiping their finger vertically up and down user interface 400. As a user moves their finger vertically up and down user interface 400, the display moves the different colored SWOOSH® along the vertical axis. In an embodiment, a colored SWOOSH® does not overlay the product as it is being moved up and down along the vertical axis. Instead each colored SWOOSH® may be positioned behind the product of interest (or not displayed) unit the colored SWOOSH® would be shown in the proper position on the product. When it is determined that the colored SWOOSH® would be shown in the proper position on the product (such as at the origin 420) then the colored SWOOSH® is displayed in that proper position. This feature may ensure that, as a SWOOSH® is being moved up and down vertically, it does not obscure the shoe, e.g., in that it may only be displayed when it is in the proper position on the product.

In another embodiment, tapping on any colored SWOOSH® not centered in user interface 400 may place the selected SWOOSH® on the centered shoe (located at the origin 420) in the center of user interface screen 400, e.g., for further consideration or additional customizations by the user.

In another aspect of the disclosure, a shoe lace color for the customized shoe may be automatically selected to match the selected SWOOSH® (e.g., by color of the SWOOSH®), unless further customized by the user.

Figure 5:
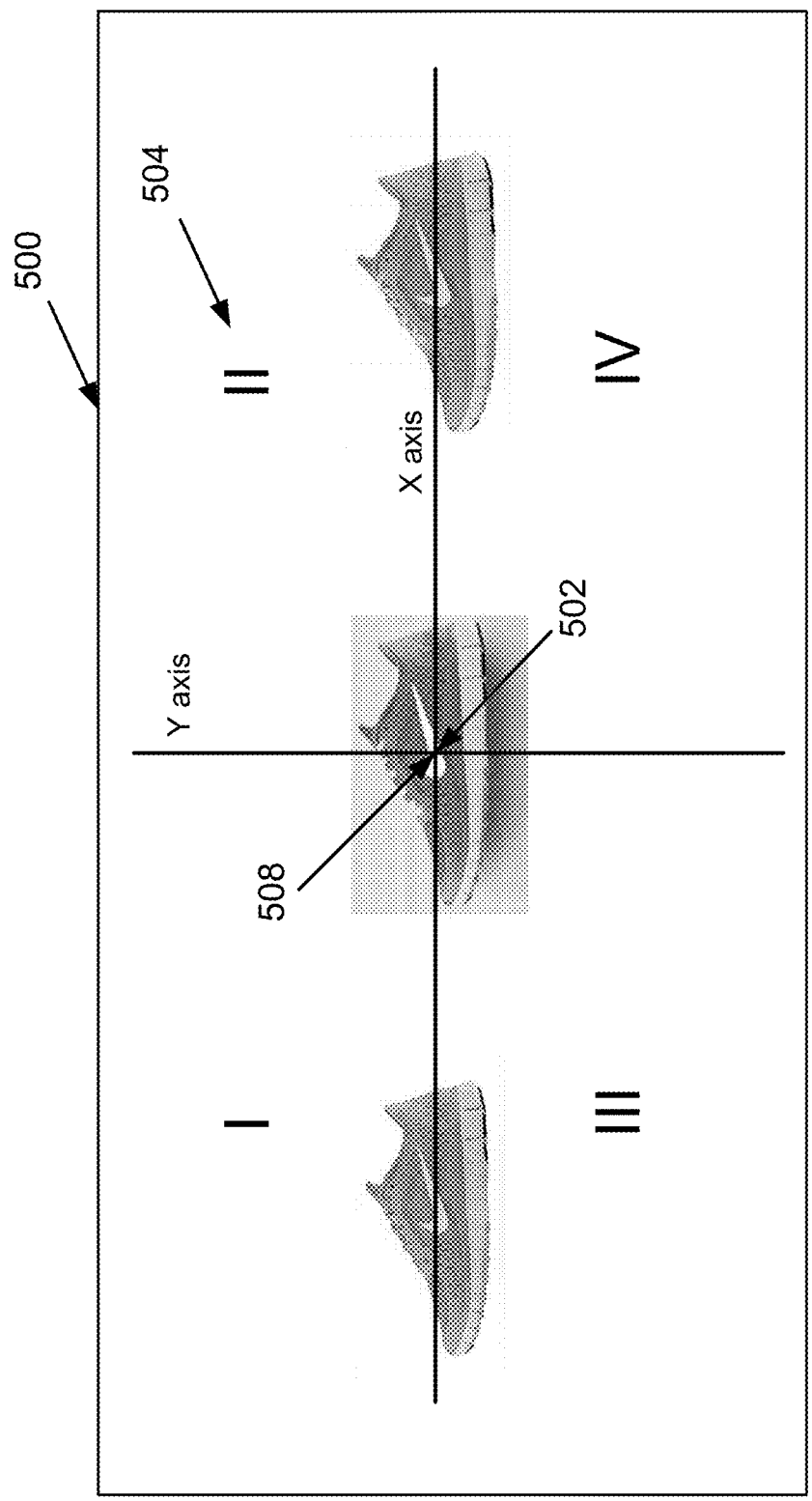
FIG. 5 illustrates an exemplary Cartesian coordinate system displayed on an interface screen which may be used in accordance with various aspects of the disclosure.

FIG. 5 illustrates a user interface 500 which displays a coordinate system having an x-axis and a y-axis in accordance with various aspects of the disclosure. As shown in user interface 500, origin 502 of the coordinate system may be located at the center of the displayed product 506. The origin 502 may also mark a center of any selected displayed graphic. The coordinate system may also include a z-axis for display of a product in a three- or multi-dimensional layout. The three- or multi-dimensional layout may be realized via a conventional display device 202 (e.g., having a display 136 implemented with conventional LCD, Plasma, OLED or other technologies, but without 3D feature), e.g., by using well known imaging techniques for providing the illusion of dimensionality, e.g., populating along the z-axis a selection of elements (e.g., alternative shoe styles) in progressively smaller sizes, progressively less crisp imaging, etc., so that these elements appear to fade into the distance toward a horizon. As an alternative, the three- or multi-dimensional layout may be realized via a 3-D display, including 3-D televisions and other more sophisticated technologies that enable a three dimensional showing of the product (e.g., a shoe) for customization or semi-customization.

Together or separately from any example embodiment as to a display 136, the display device 202 may provide a graphical user interface which includes an input interface (e.g., rather than the touch interface described above) for receiving inputs or gestures from a user of display device 202 either (i) absent touch or (ii) via any combination of touch with one or more of sound, image capture etc. As an example, an input interface may employ a combination of sensors, such as a microphone, camera and depth sensor, so as to enable a natural user interface built on spoken commands and/or movement gestures (i.e., movement gestures detected via the depth sensor's skeletal tracking and associated processing). One implementation of such an input interface may comprise Microsoft's Kinec™ for Windows® sensor unit and SDK. In an embodiment employing an input interface directed to movement gestures and/or spoken commend (e.g., with or without enabling touch-based gestures), the gestures (e.g., swipes and tap gestures) are understood to be translated to spoken or movement gestures of the same import. For example, a leftward horizontal swipe gesture may be spoken as "swipe left" and/or represented by a hand/arm movement directly horizontally across one's body, while a tap gesture respecting a shoes of a blue colorway may be spoken as "select blue shoe" and/or represented by pointing the hand/arm so as to trigger a cursor to appear positioned over such shoe and then maintaining that position for a configured or otherwise predetermined time period, or by speaking "select shoe" during that positioning.

In an embodiment, other customizations or the above discussed customizations may be made to a product along the z-axis. For example, lace colors and/or patterns may be provided along a z-axis. In this example, swiping/tapping gestures may be implemented, including, in one example, as disclosed as to graphics (i.e., the vertical axis). Moreover, one or more of the features and functionality disclosed above may be implemented with respect to the lace colors and/or patterns of the z-axis. As other examples, the z-axis may accommodate customization or semi-customization (e.g., in accordance with the disclosures hereof) as to various elements associated with the product. To illustrate, in the case where the product is a shoe, any of the following elements may be so accommodated: the upper; the lining; closures (other than laces which are already described above); lace loops or other similar components, e.g., for closures other than laces; the midsole; the airbag or other (exposed) cushioning mechanism; the outsole; and/or any embossing, engraving, embroidering, plating or other form of personal identification. In some example embodiments, the product, graphics, laces, and some selected other elements (e.g., for shoes, the elements as set forth above) may be accommodated along selected x, y, and z axes, together with selected vectors formed among 2 or more of such axes. Furthermore, the discussed features (i.e., product on the x-axis, graphics on the y-axis, and laces or others on the z-axis) may be located on different axes and are not limited to the particular axis in which they are illustrated in the present disclosure. Moreover, the origin may be moved to any position within a user interface and is so envisioned by this disclosure.

In another aspect of the disclosure, a user may diagonally swipe a user interface screen to simultaneously swipe two or more selected elements. In an example embodiment, the diagonal swipe is configured to simultaneously swipe both the product images (e.g., by colorway) of the horizontal axis and the graphics displayed on the vertical axis. Such a diagonal swipe may begin from a top right corner of a user interface screen to a lower bottom corner of a user interface screen. Such a diagonal swipe (a randomization swipe) may act similar to a random number generator or slot machine such that a random new combination of a colored product with a displayed color graphic may be shown to the user for consideration. In an embodiment, such a diagonal swipe may be a feature limited to a particular quadrant of the user interface such as the second quadrant 504 of user interface 500. In another embodiment, a diagonal swipe may function in all quadrants of the user interface.

In other example embodiments, including embodiments accommodating a three- or multi-dimensional user interface and associated customizable or semi-customizable elements; one or more diagonal swipe gestures may or may not be supported if directed to plural elements. In some embodiments, such swipes may be negated (e.g., to avoid confusion with swipes associated with an axis or vector). In still other example embodiments, including embodiments accommodating a three- or multi-dimensional user interface and associated customizable or semi-customizable elements, one more diagonal swipe gestures may be supported, such as by providing one or more feature(s) to the distinguish between a diagonal swipe directed to one element (i.e., of an axis or vector) and a diagonal swipe directed to combined elements (e.g., one finger swipes implicate a particular axis or vector, two finger swipes implicate two axes/vectors, three finger swipes implicate three axes/vectors, etc.).

Figure 6:
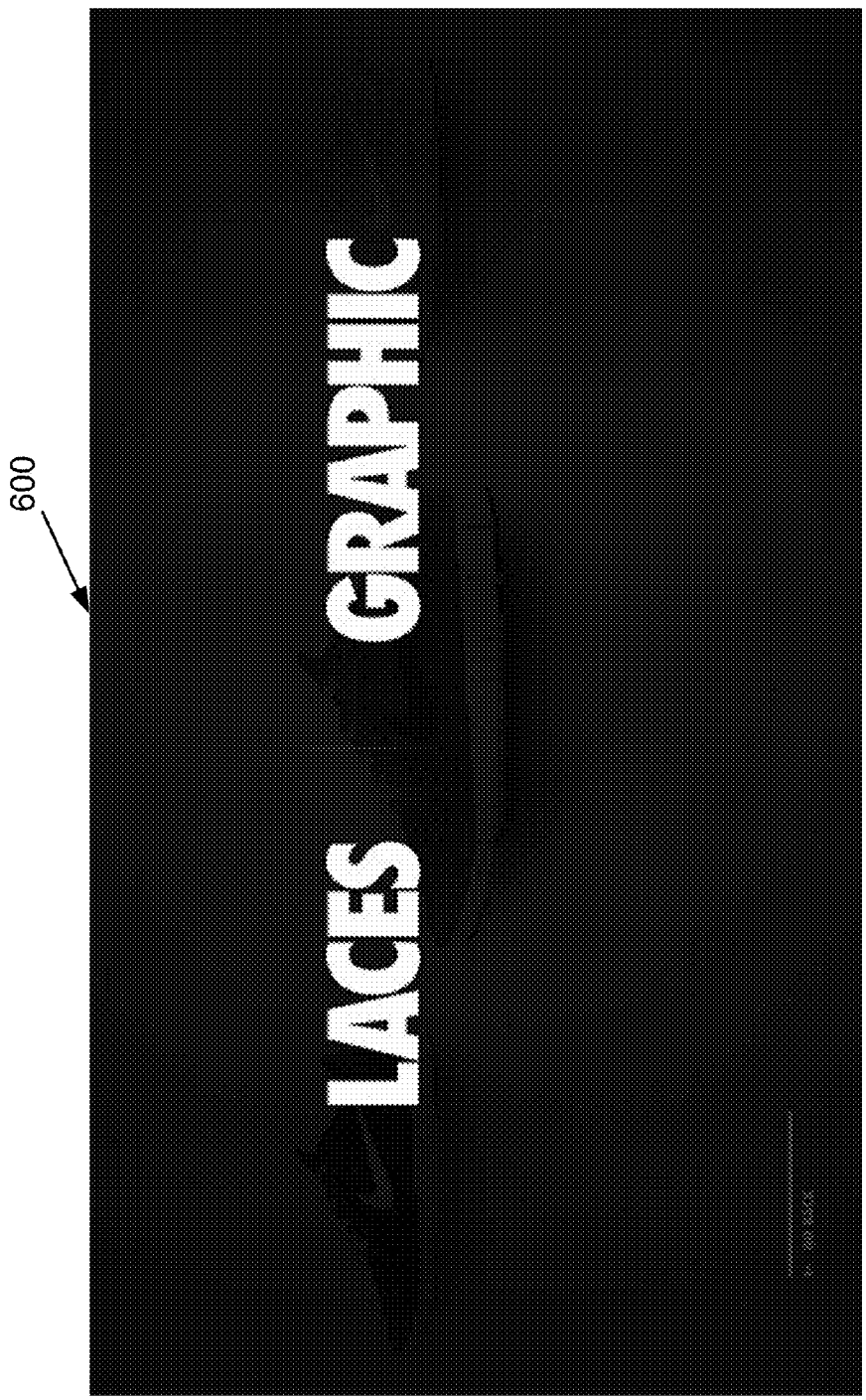
FIG. 6 illustrates an exemplary user selection interface screen in accordance with various aspects of the disclosure.
Figure 7:
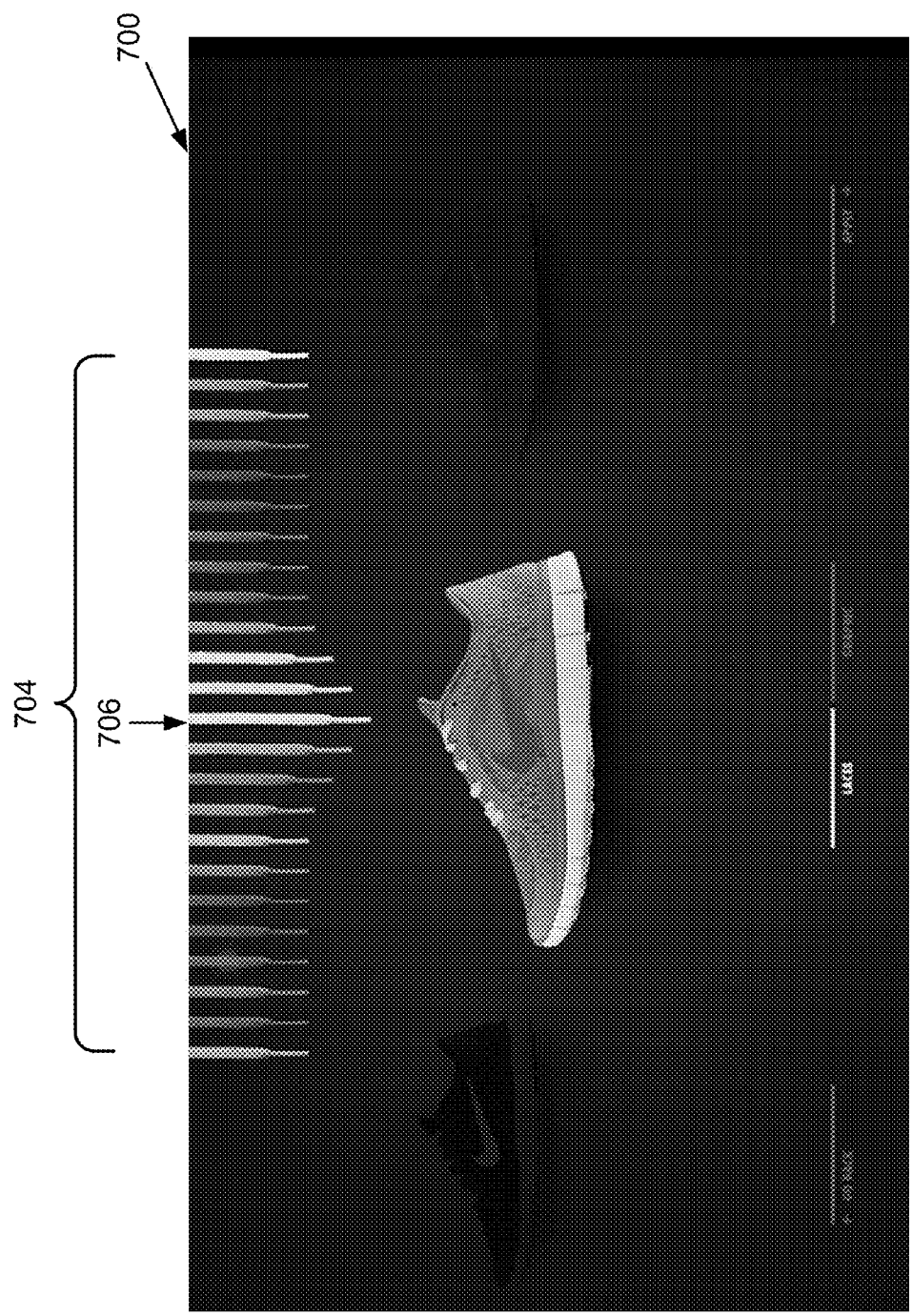
FIG. 7 illustrates an exemplary user interface screen through which product customization functionality may be used in accordance with various aspects of the disclosure.

In another aspect of the disclosure, additional customization or semi-customization of a product such as shoe lace color may also be selected by a user. In FIG. 4, upon user selection of an "Extras" feature 428 as shown on user interface 400, a user interface 600 may be presented to a user as shown in FIG. 6. Upon selection of the "Laces" feature shown in FIG. 6, a lace selection user interface screen 700 may be presented to the user as shown in FIG. 7.

In an aspect of the disclosure, user interface 700 may include a colored lace selection pallet 704 which may extend downward from the top of user interface 700. The lace selection color pallet 704 may be orientated from left to right of user interface 700 with all or selected potential lace color options displayed for user selection. A user may touch a particular lace color such as a yellow lace 706 which extends that lace (yellow lace 706) toward the displayed shoe indicating a selection of that particular lace color for further consideration. Upon selection of lace color, user interface 700 may be updated with the selected lace color displayed on the shown shoe. Such a representation enables a user to consider their customizations of lace color along with their selected shoe color and graphic selections.

In an embodiment, a user may select a different colored lace by touching user interface 700 with their finger and swiping their finger horizontally across user interface 700. As a user moves their finger horizontally across user interface 700, the display moves the different colored laces from a retracted position to a downwardly extended position to highlight the currently selected colored lace. In an example embodiment, along with a selected lace, neighboring laces that are close in color to the selected lace may also be slightly extended to highlight different color variations of the selected lace which may be of interest to the user. In an example embodiment, along with a highlighting selected lace, the laces of the shoe image display the color of that selected lace.

In an embodiment, the different colored laces may be arranged in a predetermined color palette such that various shades or variations of each color may be displayed in a systematic way to make it easier for a user to visualize the differences in the displayed colored laces. Those skilled in the art will realize that number of colored laces displayed in the horizontal axis may be altered based on the various factors such as display screen size. Those skilled in the art will realize that the set of selected laces may be changed, e.g., to switch to among supported color group, e.g., from electric to pastel to any other color. Those skilled in the art will also realize that the displayed laces may also be shown in the vertical axis, to encircle the shoe image in FIG. 7, or in other orientations all of which are within the scope of this disclosure.

In another aspect of the disclosure, additional customization or semi-customization of a product such as a graphic pattern selection may also be selected by a user. In FIG. 4, upon user selection of an "Extras" feature 428 as shown on user interface 400, a user interface 600 may be presented to a user as shown in FIG. 6. Upon selection of the "Graphics" feature shown in FIG. 6, a graphics selection user interface screen 800 may be presented to the user as shown in FIG. 8.

In an aspect of the disclosure, user interface 800 may include a graphic selection interface which may allow a user to place a pattern or apply another customization to the selected graphic or indicia discussed above.

Figure 8:
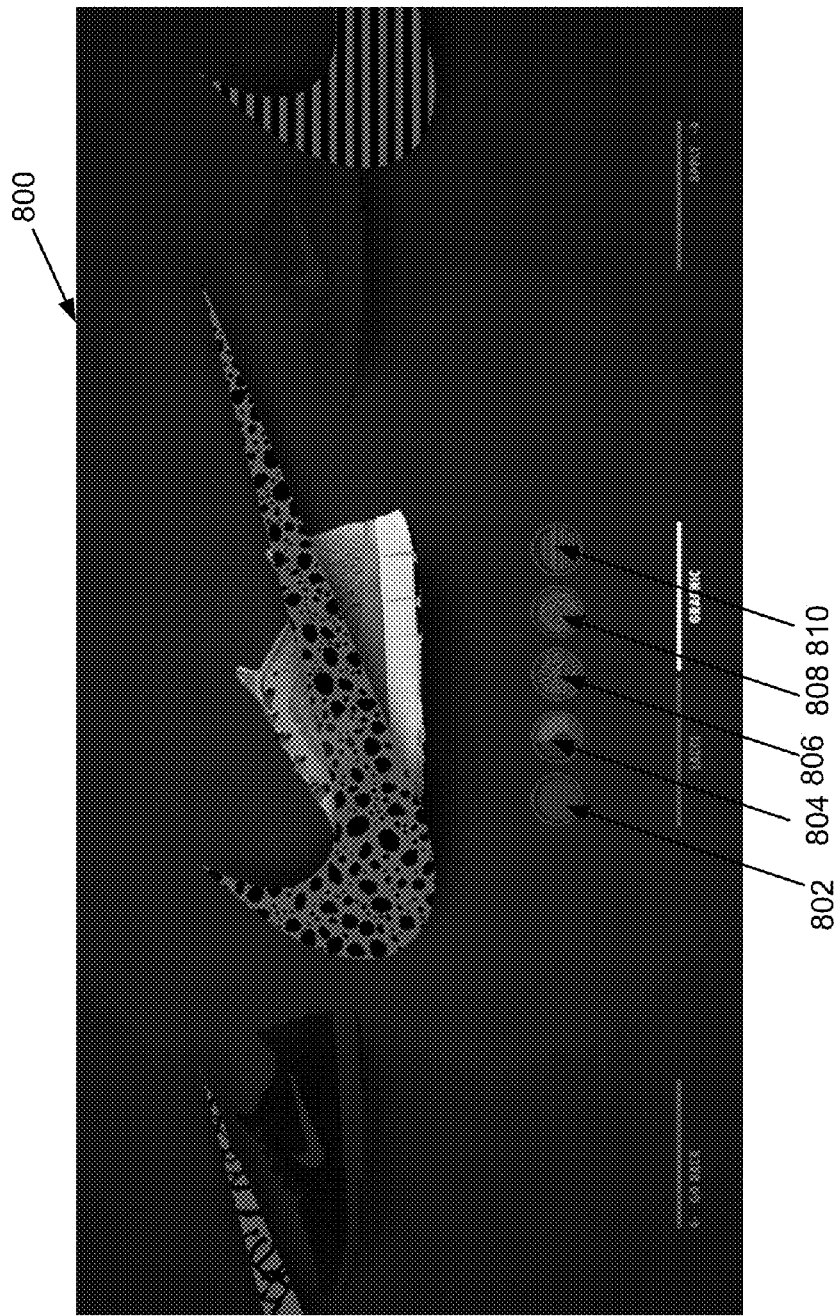
FIG. 8 illustrates another exemplary user interface screen through which product customization functionality may be used in accordance with various aspects of the disclosure.
Figure 9:
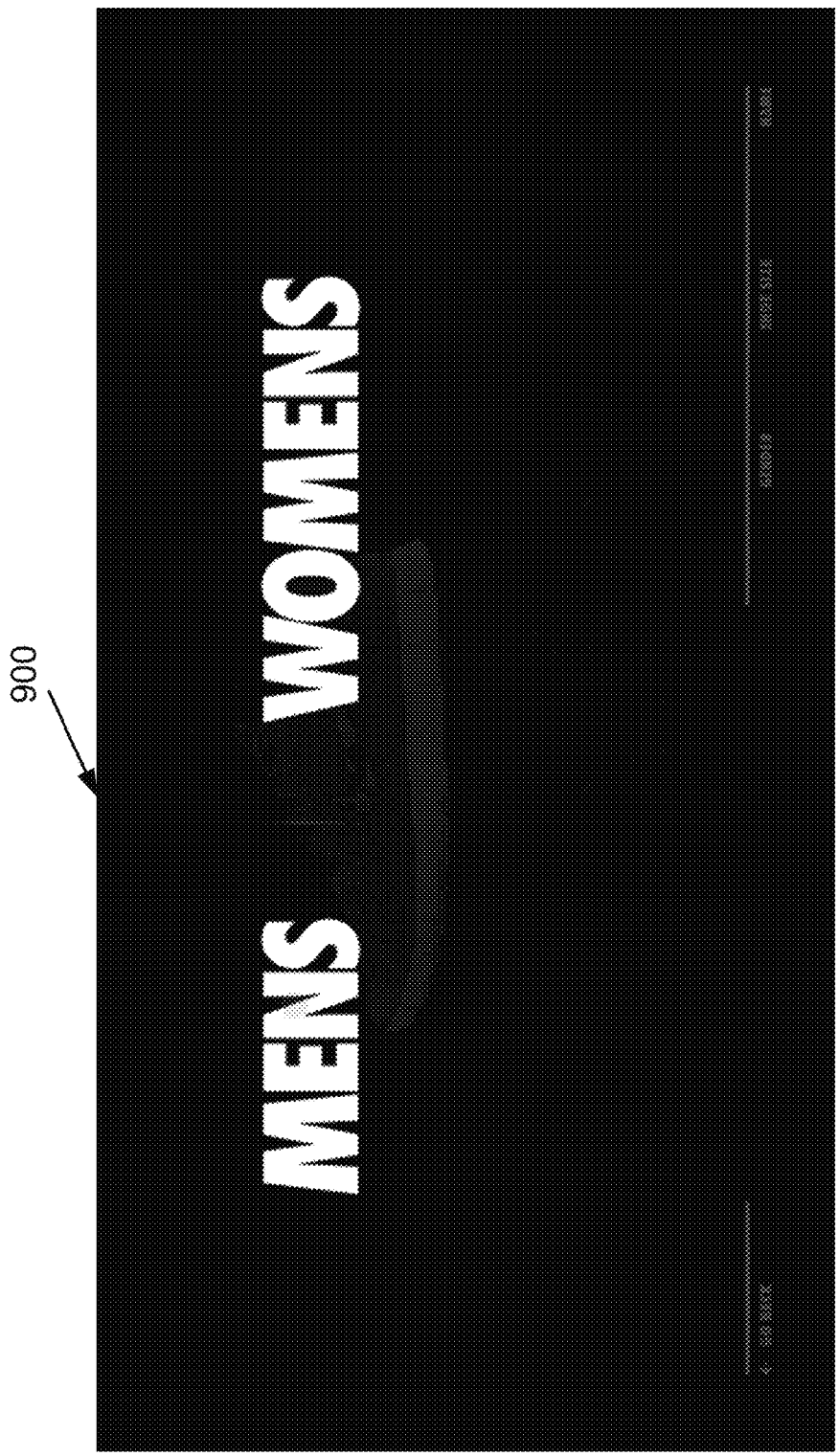
FIG. 9 illustrates a user selection interface screen in accordance with various aspects of the disclosure.

As illustrated in FIG. 8, a pattern selection tool may be displayed along a horizontal axis from left to right. A user may touch a particular pattern such as pattern 804 which places that pattern on the picture or indicia located on the shoe. Such a representation enables a user to consider their customizations of the picture or indicia along with their other customizations.

In an embodiment, a user may select a different pattern from a plurality of patterns such as patterns 804, 806, 808, and 810. The selection of a pattern or no pattern 802 may be made by a user with a touch of their finger or by swiping their finger horizontally across user interface 800. As a user moves their finger horizontally across user interface 800, the display places the selected pattern on the indicia for consideration. In an embodiment, the indicia may be a manufacture's logo such as the Nike® SWOOSH®. As shown in FIG. 8, the SWOOSH® may be enlarged so that various patterns selections that are applied may be easily viewed. In an embodiment, a zoom-in/zoom-out feature may be also incorporated to study the applied pattern selection or other customized feature to ensure the customization is acceptable to the user.

Those skilled in the art will realize that number of graphic patterns displayed in the horizontal axis may be altered based on the various factors such as display screen size. Those skilled in the art will also realize that the displayed graphic patterns may also be shown in the vertical axis or in other orientations all of which are within the scope of this disclosure.

Upon selection of a pattern or no pattern, a user may review the entire shoe customization and make any further changes to the customization as desired. The user upon final acceptance of the customized or semi-customized shoe may be prompted to provide some additional product description information.

Figure 10:
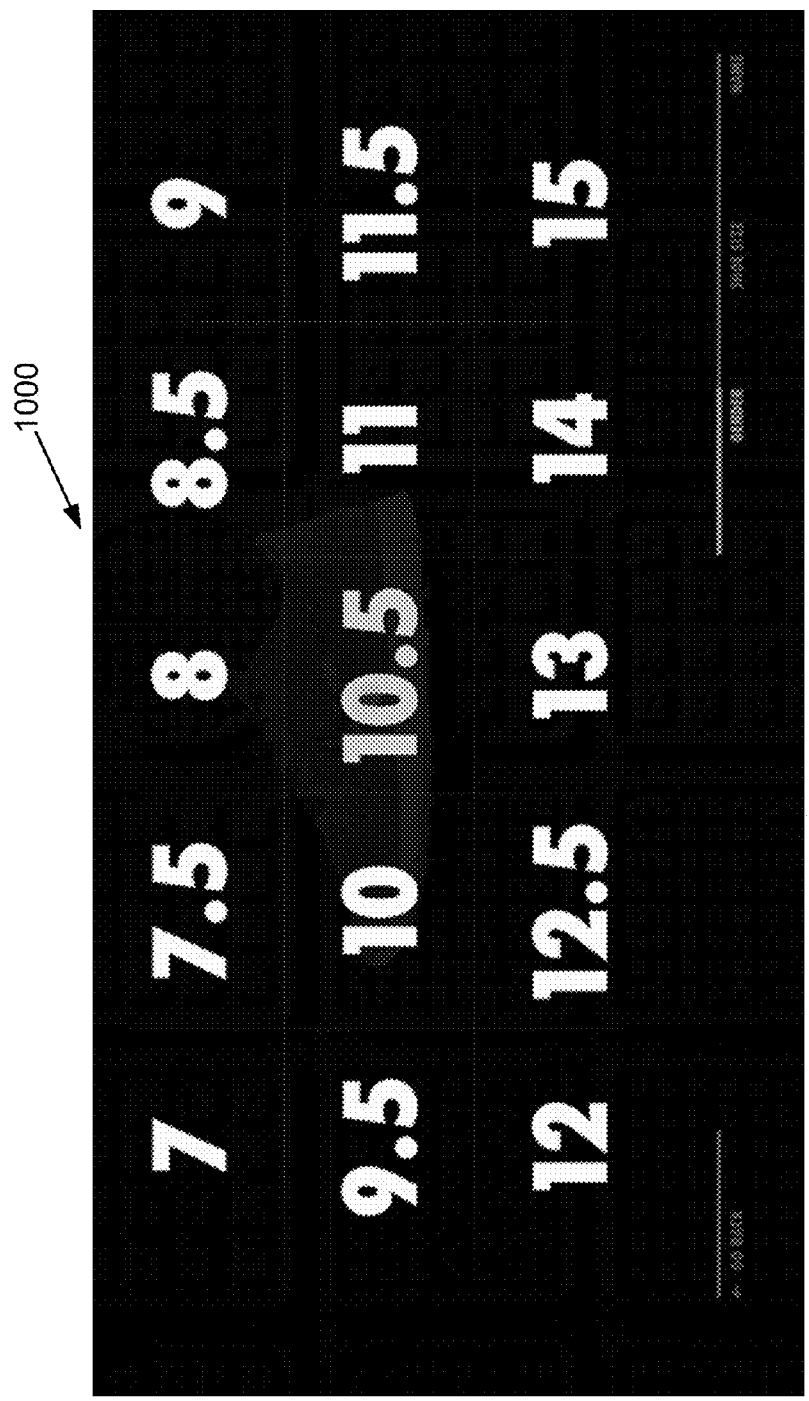
FIG. 10 illustrates another user selection interface screen in accordance with various aspects of the disclosure.

For instance, user interface 900 may request that the user identify whether the customized or semi-customized shoe is a "men's" shoe or a "women's" shoe. Upon input as to men's/women's shoe, a user interface may request that the user supply the shoe size. A user interface such as user interface 1000 of FIG. 10 may be displayed to the user to show available shoe sizes for the customized or semi-customized shoe. The user may select the desired shoe size through user interface 1000.

Figure 11:
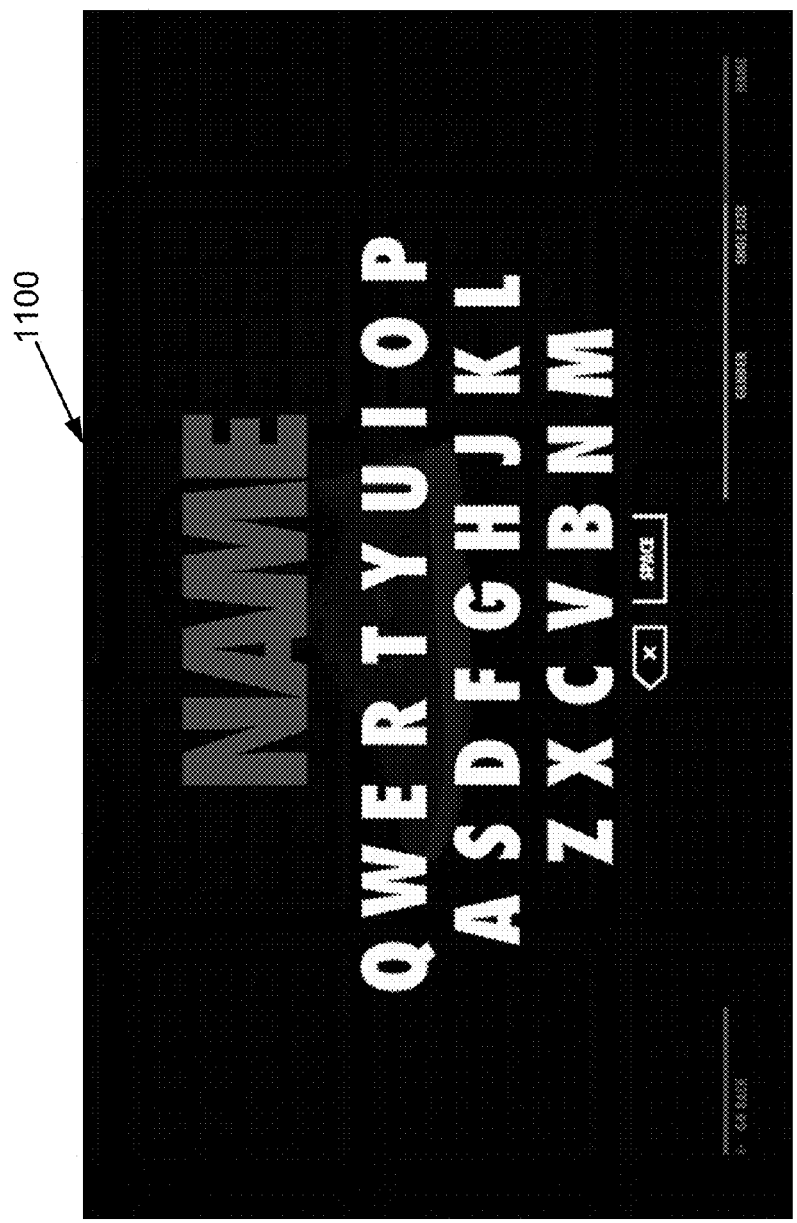
FIG. 11 illustrates a user input interface screen in accordance with various aspects of the disclosure.
Figure 12:
FIG. 12 illustrates an exemplary user information interface screen in accordance with various aspects of the disclosure.

Upon entry of the shoe size, the user interface may request that the user supply a name to be placed on the order. The user may, through user interface 1100 of FIG. 11, enter a name for the order. In addition, in some embodiments, the user may be requested to supply an email address or phone number so that the user may be contacted once the shoe has been manufactured. In some embodiments, the user may be requested to supply a delivery address (such as a street address, a P.O. address etc.), e.g., in the event that the shoe will be manufactured outside the local store and mailed or otherwise delivered to the user. In response to the user requested information, a user interface such as user interface 1200 of FIG. 12 may be displayed to thank the user and provide information to the user. Such information may include information such as a store associate (e.g., a "Nike Athlete") may be sent over to the customer in order to verify and complete the order.

Figure 13:
FIGS. 13-14 illustrate exemplary payment interface screens through which payment processing may be used in accordance with various aspects of the disclosure.
Figure 14:
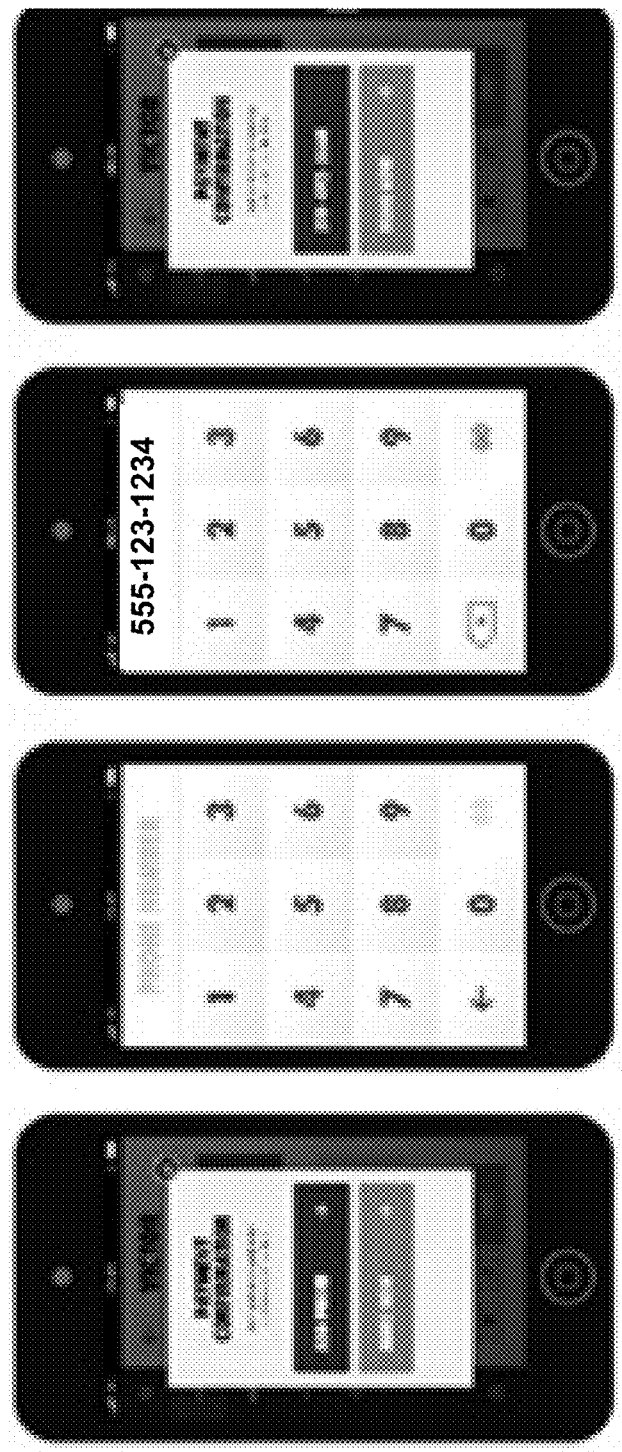
Figure 15:
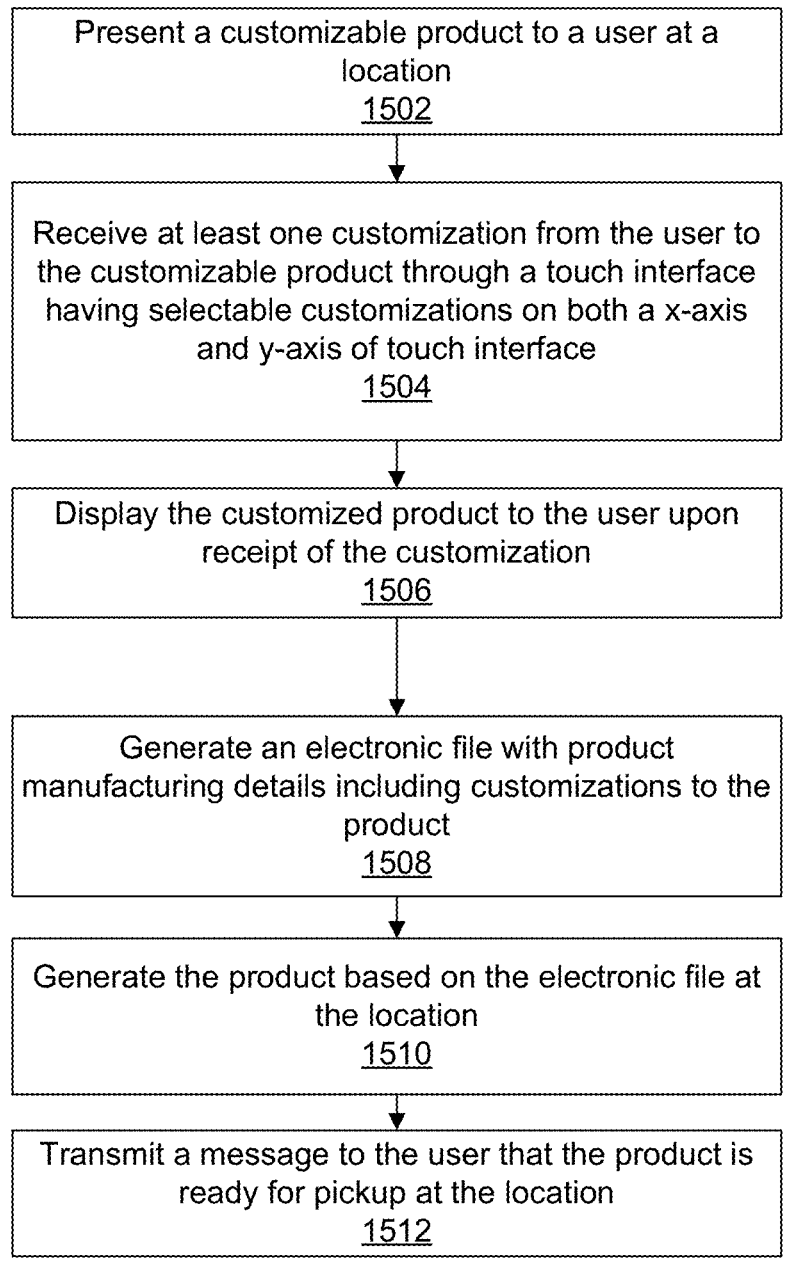
FIG. 15 illustrates a flow diagram in accordance with various aspects of the disclosure.

In an embodiment, the store associate may assist the user in ensuring that the customized or semi-customized order is complete and that the correct shoe size has been entered. Upon order verification, the store associate may request payment from the user. The transaction may be completed via a wirelessly handheld device as shown in FIGS. 13-14. In other embodiments, the transaction may be completed through a store register or through other ordering payment and processing equipment Upon order completion, an electronic shoe customization file may be generated and transmitted to a backroom or other location associated with the store, for local manufacturing of the shoe, e.g., as the user continues to shop or otherwise on an "while-you-wait" basis. Upon such manufacturing's completion of the customized product, the user may be notified that their order is ready for pick-up. In other examples, the electronic shoe customization file may be generated and transmitted to a remote site, for custom manufacturing for, and direct delivery to, the customer. In some examples, if the order is placed by a certain time on one day, the manufacture may be completed overnight or otherwise relatively rapidly, such that delivery may be to the user's home or other user-designated delivery location (including the store at which the user developed the customization), e.g., on a next day, two day or other similar basis.

In the aspect of the disclosure, the customization server and display device 202 may be may be used to compare and contrast multiple shoes simultaneously.

In an aspect of the disclosure, initiation of a customization session may result in generation of a customization identification number (e.g., a unique "customization ID") by a customization server or other computing device that may be in control of the session and the transfer of data relating to the session. In an embodiment, an Order Acknowledgement Receipt (OA) may be used to capture a bar code for the lace, shoe, and SWOOSH®, for later scanning.

In an aspect of the disclosure, at a step 1502 a customization server may transmit and display products that may be customized by a user. In step 1504, at least one customization may be received from a user to customize a product through a touch interface having selectable customizations on both an x-axis and a y-axis. In a step 506, a customized product may be displayed to a user for review of further customization. Upon approval, an electronic file with product manufacturing details including customizations may be generated at a step 1508. Based on the generated electronic file, the customized product may be manufactured at an on-site location. In step 1512, a message may be transmitted to a user providing information such as the customized product is ready for pickup at the retail site.

In another aspect of the disclosure, the above described user interface screens may include one or more controls for changing the appearance or view of the product in portion (such as rotation controls, zoom-in, zoom-out, change in views shown, etc.), an "undo" control (to eliminate the last action), a "redo" control (to re-do a previously erased action), a cost information panel, and a product design information panel.

Other features and functionality may also be provided in the customization interface, if desired, without departing from this disclosure. The following features and functionality may be provided in some manner via the interface: the ability to directly return to a previously customized product, the ability to save the design, the ability to print the design, the ability to store this design at a location for sharing with others (which may launch an interface that allows one to identify specific persons, classes of persons, or groups (public or private) with whom the design may be shared), the ability to "return to the default" design (e.g., to the blank product on which the customization process was initiated for this product), and the ability to exit or quit the session.

As an additional potential feature, systems, methods, and computer interfaces in accordance with at least some examples of this invention may allow the user to get help during the design or customization process. Such assistance may be from a store associate or via computer generated "on-line help." While any desired information may be provided in response to user interaction with this portion of the interface, in some examples, the systems, methods, and computer interfaces may display to the user information such as: a display of one or more other user designs of the same product (or a selected portion of the product); a display of one or more other user designs of a product (or a selected portion of a product) having the same or similar uses, characteristics, or functions; a display of one or more other user designs by users with similar tastes or interests as the user (e.g., same favorite sports team, same favorite recreational activities, etc.); a display of one or more other user designs by users from the same geographical region as the user; a display of one or more other user designs by users from the same age group as the user; a display of one or more other user designs by users from the same profession as the user; a display of one or more other user designs by users who otherwise share the user's demographic; a display of one or more other user designs by user's who are within one or more of the user's relevant social graph network (e.g., Nike+); suggestions for different colors or color combinations that might match well with existing portions of the design (e.g., complementary colors); information regarding popular colors or color combinations for one or more portions of the design (e.g., from previously designed products or inventory); and/or any other desired information (including information relating to the specific product or product line or other interesting designs or inspiring information). This interface also may include functionality to allow the user to immediately purchase the customized shoe at any time during the design process.

Changes to various selected portions of the shoe design may be made in any desired manner without departing from this invention. For example, a user might first use an input device to select some specific part of the shoe (e.g., the heel reinforcement part, a visible portion of the midsole, a portion of the outsole, the tongue, eyelets, toe cap, tread elements, etc.). Once selected, the user can make changes to that element.

Various additional potential features and functionality may be included in systems, methods, and user interfaces in accordance with at least some examples of this invention. For example, a personalized message may be placed on the lateral side of the shoe in lieu of the usual location of the manufacturer's logo. If desired, systems, methods, and user interfaces in accordance with examples of this invention also may allow the user to drag the message around (e.g., using the pointer device) to aid in positioning or orienting the message with respect to the shoe structure. The personalized message may be applied to any desired portion of the shoe structure being designed, such as the upper, the midsole, the outsole, the interior bootie, the tongue element (top side or underside), etc., and even to multiple parts of the shoe, if desired.

In another aspect of the disclosure, the entity or store location maintaining the custom design may store the customization for the user for future use such as a secondary purchase of the shoe design at a future date and time. The entity maintaining the custom design may require that users register for this privilege by providing personal information such as name, geographic address, email address, and the like.

Those skilled in the art will readily appreciate that the systems, methods, and/or computer interface features described above in conjunction with design and/or shopping for articles of footwear also may be used and/or practiced in conjunction with design of other products, such as apparel (including athletic apparel, uniforms, etc.) and athletic equipment (such as balls, bats, gloves, bags, protective equipment, team gear, pads, hockey sticks, watches, socks, etc.).

Figure 16:
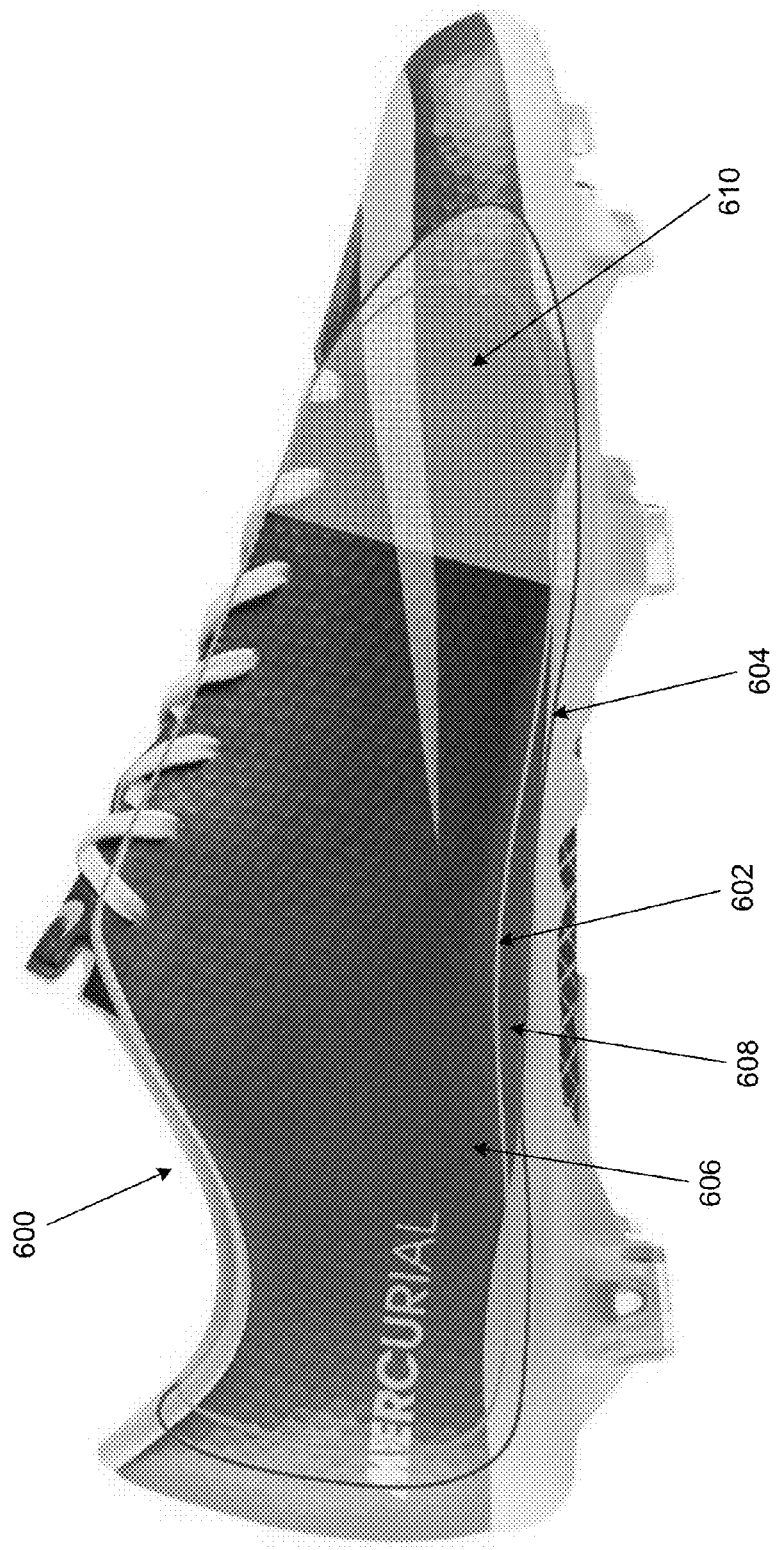
FIG. 16 illustrates exemplary print boundaries within which customizations may be applied to an exemplary article of footwear.

FIG. 16 illustrates exemplary print boundaries 602 and 604 within which customizations may be applied to an exemplary article of footwear 600. Print boundary 602 may correspond to an "inner" print boundary defining a target area 606 for printing customizations on the article of footwear 600. Print boundary 604 may correspond to an "outer" print boundary defining another target area 608 for printing customizations on the article of footwear 600. The target area 606 may be enclosed by the "inner" print boundary 602 and be better suited for receiving relatively smaller fonts (e.g., 6 point fonts) and relatively detailed graphics. The target area 608 may be positioned between the "inner" print boundary 602 and the "outer" print boundary 604. The target area 608 may be better suited for receiving solid colors and gradients.

Customizations may be printed on various customization zones of the article of footwear 600, e.g., the lateral quarter, the medial quarter, the heel, the tongue, the lateral midsole, the medial midsole, the lateral airbag, the medial airbag, and other zones of the article of footwear that will be appreciated by those skilled in the art. The article of footwear 600 may also include a "flex" zone 610 near the front of the shoe where the forefoot of a user would be positioned when the article of footwear is worn by the user. When printing customizations in the "flex" zone 610, a printer may employ a relatively lower ink density relative to other zones of the article of footwear. For example, the printer may employ CMYK (cyan, magenta, yellow, and black) printing techniques to print the customizations on the article of footwear. The ink density may thus be expressed as a total percentage of the CMYK ink channels used to print the customization. It will be recognized that the maximum total ink density for CMYK printing is 400%-100% for each of the four CMYK ink channels. The total ink density for printing customizations in the "flex" zone 610 may be, for example, around 220%.

FIGS. 17-21 illustrate other user selection interface screens in accordance with various aspects of the disclosure. As described above, customizations may include, e.g., a base color for the product; one or more accent colors for the product; a graphic printed on the product; and text printed on the product. Customizations may also include a fill color for the text or graphic and a fill pattern for the text or graphic. Graphics may include shapes, logos, badges, icons, symbols, and so forth. Combinations of customizations may also be selected for the product, e.g., combinations of multiple colors, combinations of multiple graphics, combinations of text and graphics, and so forth. Moreover, the size, orientation, and location of the text and graphics on the product may be adjusted. For text data, various fonts may be selected. As an example, a team may customize the footwear of the players on the team to include the team colors and a team logo. The footwear for individual players may be further customized to include, e.g., the name of the player, the nickname of the player, and the player number.

Figure 17:
FIG. 17 illustrates another user selection interface screen in accordance with various aspects of the disclosure.

FIG. 17 illustrates a user selection interface screen 1700 for customizing an article of footwear with a combination of a graphic and text data. In FIG. 17, the graphic is a badge that incorporates text data provided by the user, e.g., the last name and player number of the user. The user selection interface screen 1700 presents a set of customizations for the graphic and text data on a vertically scrollable axis 1704. In FIG. 17, the set of customizations is a set of colors 1706, 1708, 1710, 1712, and 1714 for the graphic and text data. The scrollable axis 1704 may be positioned such that the scrollable axis passes through the center 1716 of the rendering of the article of footwear. The user may vertically swipe along the axis 1704 to scroll through the set of colors available for the graphic and text data. The rendering of the article of footwear is updated as the user scrolls through the set of colors on the axis 1704 in order to display the currently selected color for the graphic and text data on the rendering of the article of footwear. The user selection interface screen 1700 may also include an interface element 1718 for adjusting the size of the graphic and text data relative to the article of footwear. The rendering of the article of footwear may thus also be updated when an adjustment of the size of the graphic and text data is received. Other interface elements may be employed to adjust, e.g., an orientation of the graphic and text data relative to the article of footwear. The scrollable axis 1704 may also be oriented at any angle between 0° and 180° relative to a centerline of the user selection interface screen, e.g., such that the scrollable axis is vertically, horizontally, or diagonally scrollable.

Figure 18:
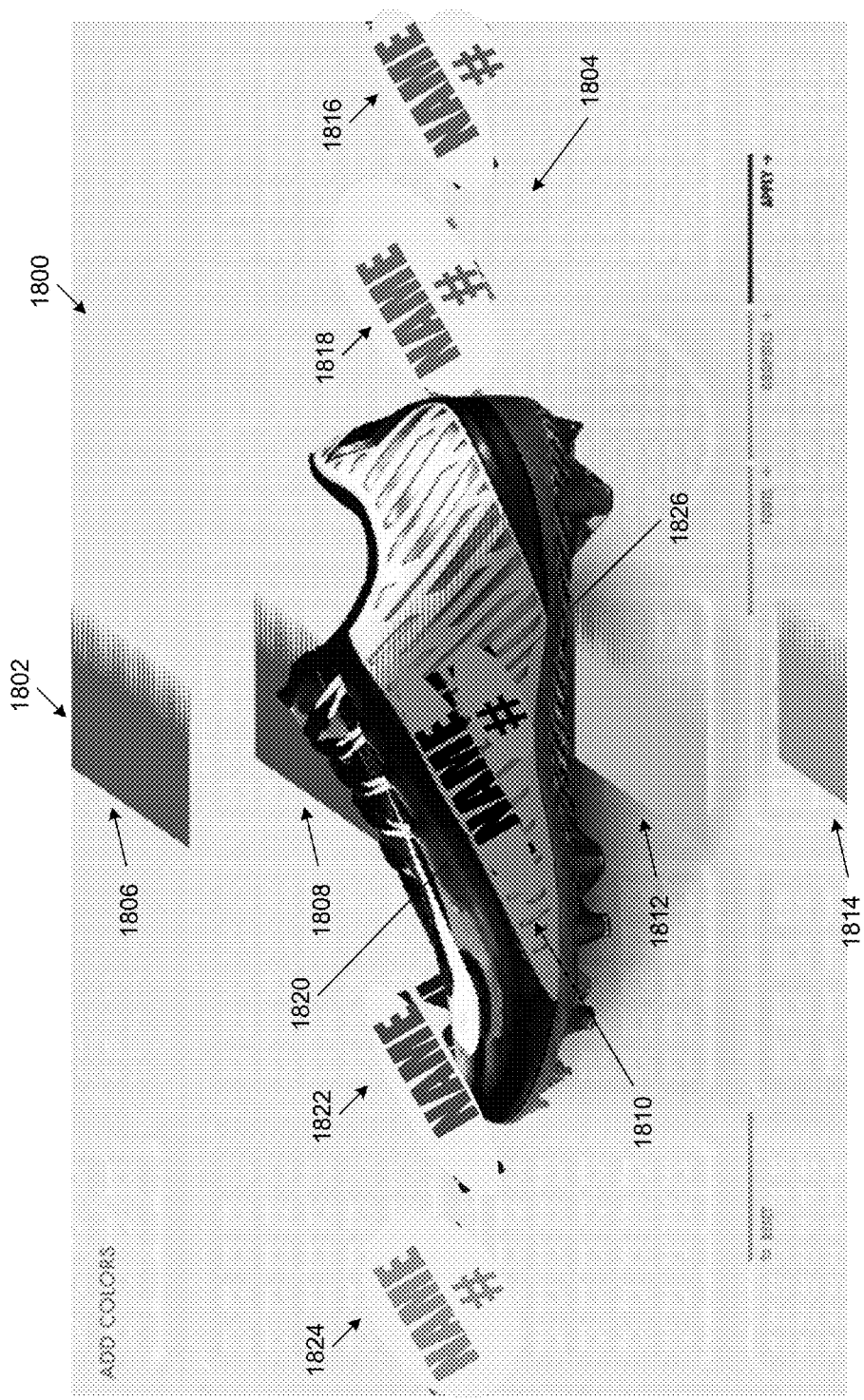
FIG. 18 illustrates another user selection interface screen in accordance with various aspects of the disclosure.

FIG. 18 illustrates a user selection interface screen 1800 for customizing an article of footwear with another combination of a graphic and text data. In FIG. 18, the graphic is a shape having a textured edge on which the text data is overlaid. The user selection interface 1800 presents multiple sets of customizations for the graphic and text data at respective scrollable axes 1802 and 1804. The scrollable axis 1802 is a vertically scrollable axis, and the scrollable axis 1804 is a horizontally scrollable axis. The set of customizations presented on the vertically scrollable axis 1802 is a set of colors 1806, 1808, 1810, 1812, and 1814 for the graphic. The set of customizations presented on the horizontally scrollable axis 1804 is a set of colors 1816, 1818, 1820, 1822, and 1824 for the text data. In FIG. 18, the vertically scrollable axis 1802 and the horizontally scrollable axis 1804 intersect, and the rendering of the article of footwear is positioned such that the center 1826 of the rendering of the article of footwear is positioned at the intersection of the scrollable axes. The user may vertically swipe the vertical axis 1802 to scroll through the colors available for the graphic and horizontally swipe the horizontal axis 1804 to scroll through the colors available for the text data. The rendering of the article of footwear is updated as the user scrolls through the sets of colors on the axes 1802 and 1804 in order to display the currently selected color combination for the graphic and text data on the article of footwear. The scrollable axes 1802 and 1804 may also be oriented such that the sum of a pair of opposite angles formed by the intersection of the axes is between 0° and 180° and at least one of the axes is diagonally scrollable.

Figure 19:
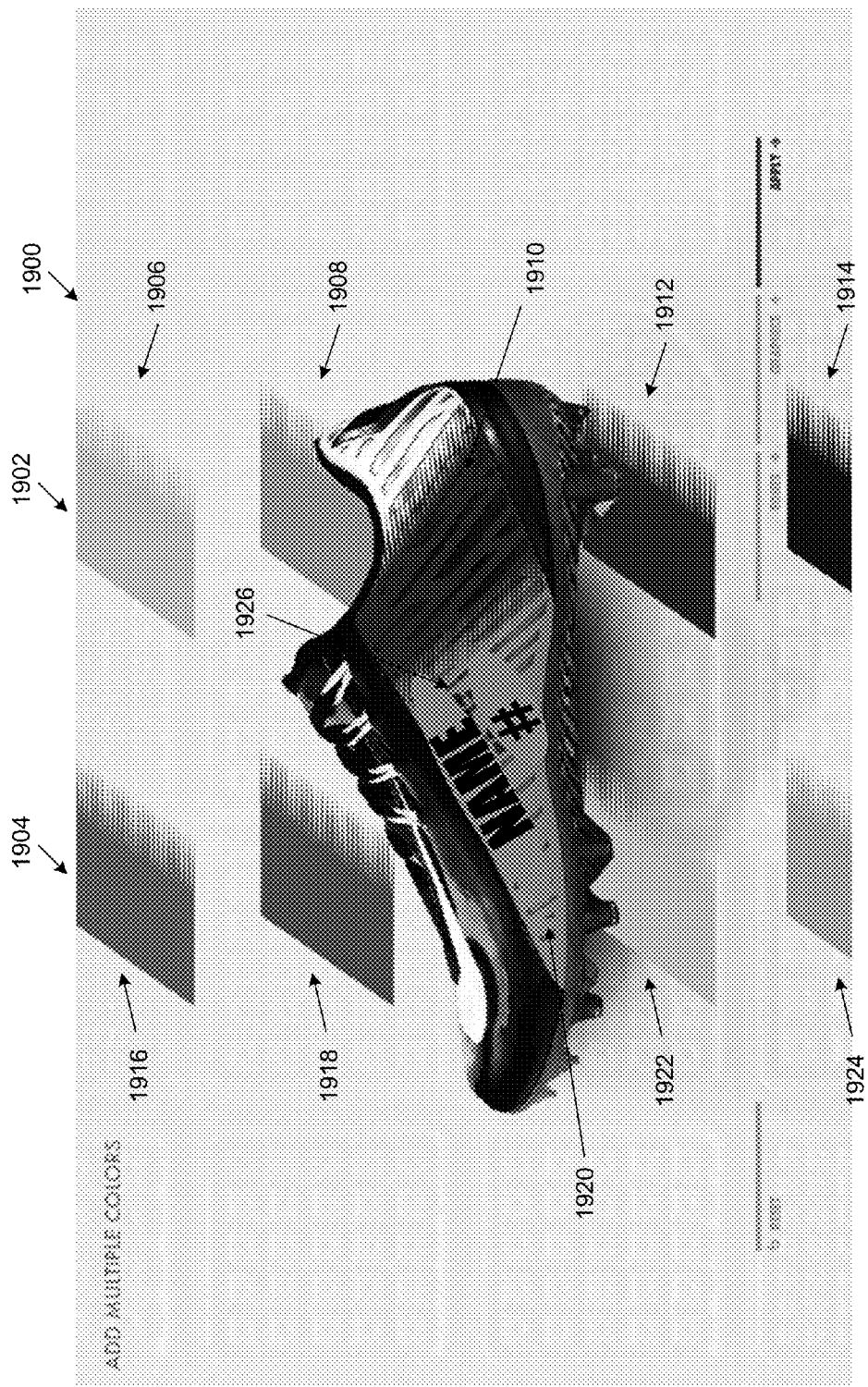
FIG. 19 illustrates another user selection interface screen in accordance with various aspects of the disclosure.

FIG. 19 illustrates a user selection interface screen 1900 for customizing an article of footwear with a combination of graphics. In FIG. 19, each graphic is a shape having a textured edge each of which is applied to a respective portion of the article of footwear, e.g. an area near the front of the midfoot region and an area near the rear of the midfoot region. The user interface selection screen 1900 presents multiple sets of customizations for the graphics at respective scrollable axes 1902 and 1904. In FIG. 19, each scrollable axis 1902 and 1904 is a vertically scrollable axis that each present a respective set of customizations for the graphics. The set of customizations presented on the vertically scrollable axis 1902 is a set of colors 1906, 1908, 1910, 1912, and 1914 for the graphic positioned near the rear of the midfoot region. The set of customizations presented on the vertically scrollable axis 1904 is also a set of colors 1916, 1918, 1920, 1922, and 1924 for the graphic positioned near the front of the midfoot region. The rending of the article of footwear is updated as the user scrolls through the sets of colors on the axes 1902 and 1904 in order to display the currently selected color combination for the graphics. In FIG. 19, the vertically scrollable axes 1902 and 1904 are parallel with each other, and the center 1926 of the rendering of the article of footwear is positioned between the vertically scrollable axes. The parallel axes 1902 and 1904 may also be oriented at any angle between 0° and 180° relative to a centerline of the user selection interface screen, e.g., such that the scrollable parallel axes are vertically, horizontally, or diagonally scrollable.

Figure 20:
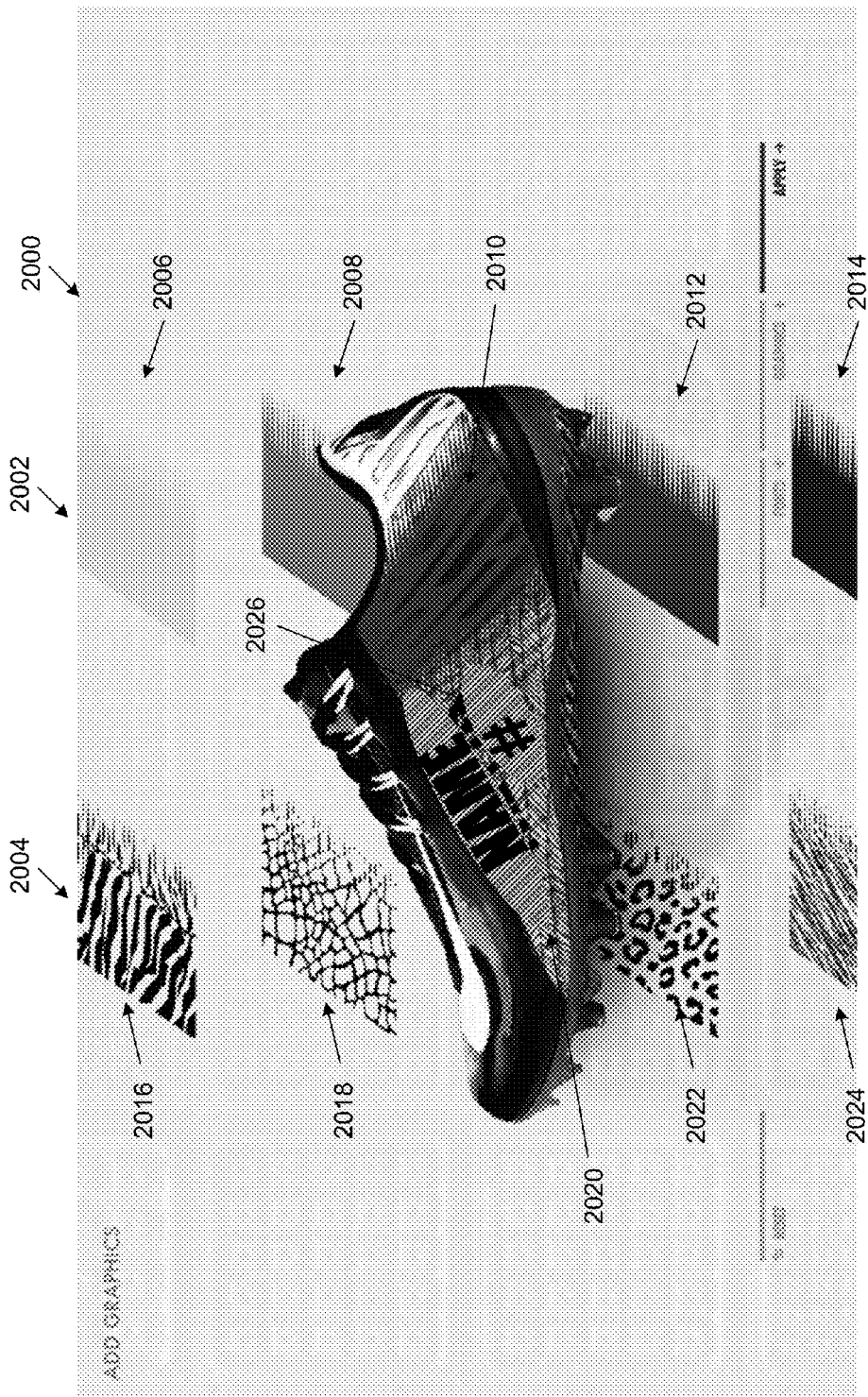
FIG. 20 illustrates another user selection interface screen in accordance with various aspects of the disclosure.

FIG. 20 illustrates another a user selection interface screen 1900 for customizing an article of footwear with a combination of graphics. In FIG. 19, each graphic is again a shape having a textured edge each of which is applied to a respective portion of the article of footwear, e.g., an area near the front of the midfoot region and an area near the rear of the midfoot region. The user interface selection screen 2000 again presents multiple sets of customizations for the graphics at respective scrollable axes 2002 and 2004. In FIG. 19, the scrollable axes 2002 and 2004 are again vertically scrollable and parallel with the center 2026 of the rendering of the article of footwear positioned between the axes. Each scrollable axis 2002 and 2004 present a respective set of customizations for the graphics. The set of customizations presented on the vertically scrollable axis 2002 is a set of colors 2006, 2008, 2010, 2012, and 2014 for the graphic positioned near the rear of the midfoot region. The set of customizations presented on the vertically scrollable axis 2004 is a set of fill patterns for the graphic positioned near the front of the midfoot region. Fill patterns may include, e.g., a solid fill pattern, a "zebra" fill pattern, a "reptile" fill pattern, a "leopard" fill pattern, and so forth. Other types of fill patterns may be selectively employed.

Figure 21:
FIG. 21 illustrates another user selection interface screen in accordance with various aspects of the disclosure.

FIG. 21 illustrates a user selection interface screen 2100 for customizing an article of footwear with a graphic. In FIG. 18, the graphic is a "winged" badge positioned on a midfoot region of the article of footwear. The user selection interface presents multiple sets of customizations for the graphic at respective scrollable axes 2102 and 2104. The scrollable axis 2102 is a horizontally scrollable axis, and the scrollable axis 2104 is a vertically scrollable axis. the set of customizations presented on the horizontally scrollable axis 2102 is a set of badge styles for the "winged" badge. The set of customizations presented on the vertically scrollable axis 2104 is a set of colors 2112, 2114, 2116, 2118, and 2120 for the currently selected badge style. In FIG. 21, the horizontally scrollable axis 2102 and the vertically scrollable axis 2104 intersect with the center 2122 of the rendering of the article of footwear positioned at the intersection of the scrollable axes. The user may horizontally swipe the horizontal axis 2102 to scroll through the different badge styles available for the "winged" badge. The user may vertically swipe the vertical axis 2104 to scroll through the colors available for the currently selected "winged" badge style. The rendering of the article of footwear is updated as the user scrolls through the set of badge styles and set of colors on the respective axes 2102 and 2104 in order to display the currently selected badge style and color combination on the rendering of the article of footwear. The scrollable axes 2102 and 2104 may also be positioned such that at least one of the axes is diagonally scrollable.

FIG. 22 illustrates a representation of exemplary manufacturing information 2200 corresponding to exemplary customizations selected by a user for an article of footwear. The manufacturing information 2200 may include information from various templates corresponding to the product and the customizations selected by the user. The various templates may include, for example, a base template 2202 for the product, one or more customization templates 2204 for customizations selected by the user and text received from the user during customization of the product, and one or more fill templates 2206 for fill patterns selected by the user during customization of the product. The base template 2202 may include information (e.g., coordinates) defining an outline of the product as well as one or more regions of the product available to receive customizations. The customization templates 2204 may include information (e.g., coordinates) defining an outline for a graphic selected by the user or text provided by the user. The information of a customization template 2204 may depend and be based on a size and an orientation of the customization specified by the user during customization of the product. The manufacturing information 2200 may also include information (e.g., coordinates) indicating a location on the product (e.g., an origin location) at which to apply a customization. The fill pattern templates 2206 may include information (e.g., coordinates) that define the fill pattern. The manufacturing information may also include information that associates a customization template 2204 with a fill pattern template 2206 corresponding to the fill pattern selected for the customization. The manufacturing information may also include information (e.g., a CMYK value) that indicates a color selected for a fill pattern of a customization. Additional and alternative types of manufacturing information that may be included in the electronic file will be appreciated with the benefit of this disclosure.

As described above a product may be customized at the same site at which the customer selects customizations for the product. As an example, a customer may customize an article of footwear at a shoe store, and a printer located at the shoe store may print the selected customizations of the article of footwear while the customer waits at the store. Alternatively, the printer may be located remotely relative to the display device, input interface, and customization server. The electronic file that includes the manufacturing information indicating the customizations selected by the user may be transmitted to the remote printer, and the printer may customize the article of footwear at a remote location. The customized article of footwear may then be delivered to the customer, e.g., via express mail or express parcel delivery.

While the invention has been described with respect to specific examples including presently preferred modes of carrying out the invention, those skilled in the art will appreciate that numerous variations and permutations of the above described systems and techniques may be made without departing from this invention. For example, the systems, methods, and/or user interfaces may include more, less, and/or different functionality from that described above, and the various features of the systems, methods, and/or user interfaces may be activated or interacted with in various different manners (e.g., using different types of interface elements) from those described above. Also the various process steps may be changed, changed in order, some omitted, and/or include additional steps or features without departing from this invention. Various changes and modifications to the systems, methods, and user interfaces may be made without departing from the spirit and scope of the invention, as set forth in the appended claims.

What is claimed is:

1. A method for customizing consumer products comprising:
presenting, by a touch screen, a rendering of a customizable product to a user;
presenting, by the touch screen, a set of customizations of a feature of the product on a linearly scrollable axis wherein the axis passes through the rendering and wherein first and second customizations of the set of customizations are depicted on the axis and positioned adjacent to each other on the axis;
in response to receiving, by the touch screen, a first input from the user causing scrolling of the axis, updating the rendering of the product upon the first or second customization traversing the rendering of the product during scrolling of the axis by presenting the product as being customized with the first or second customization, wherein, during scrolling of the axis, the first and second customizations do not obscure at least a portion of the rendering of the product;
in response to receiving, by the touch screen, a second input from the user,
selecting the first or second customization,
updating the rendering of the product to present the product as being customized with the first or second customization, and
generating, using a template corresponding to the first or second customization, an electronic file having product manufacturing details that indicate the first or second customization; and
manufacturing the product according to the product manufacturing details of the electronic file.

2. The method of claim 1 further comprising:
customizing the product based on the product manufacturing details of the electronic file; and
transmitting a message to the user indicating when the customizing of the product is complete.

3. The method of claim 2 wherein:
the product is an article of footwear; and
customizing the product includes printing the first or second customization on the article of footwear.

4. The method of claim 3 wherein the set of customizations is a first set of customizations, the scrollable axis is a first scrollable axis, and further comprising:
presenting, by the touch screen, a second set of customizations of a second feature of the product on a second scrollable axis.

5. The method of claim 4 wherein the first scrollable axis and the second scrollable axis intersect and further comprising:
positioning, by the touch screen, the rendering of the product such that a center of the rendering is located at an intersection of the first scrollable axis and the second scrollable axis.

6. The method of claim 5 wherein:
the first scrollable axis is oriented horizontally; and
the second scrollable axis is oriented vertically.

7. The method of claim 4 wherein the first scrollable axis and the second scrollable axis are parallel and further comprising:
positioning, by the touch screen, the rendering of the product such that a center of the rendering is located between the first scrollable axis and the second scrollable axis.

8. The method of claim 4 wherein:
the first set of customizations is a set of graphics, each graphic in the set of graphics being printable on a portion of the article of footwear; and
the second set of customizations is a set of base colors for the article of footwear.

9. The method of claim 4 wherein:
the first set of customizations is a set of graphics, each graphic in the set of graphics being printable on a portion of the article of footwear; and
the second set of customizations is a set of colors for a graphic selected by the user from the set of graphics.

10. The method of claim 1 further comprising:
receiving textual data from the user through a touch interface of the touch screen;
updating the rendering of the product to display the textual data on a portion of the product; and
wherein the set of customizations is one of a set of colors for the textual data, a set of fonts for the textual data, or a set of fill patterns for the textual data.

11. A system for customizing consumer products comprising:
a display device that presents to a user a rendering of a customizable product and a set of customizations of a feature of the product on a linearly scrollable axis wherein the axis passes through the rendering and wherein first and second customizations of the set of customizations are depicted on the axis and positioned adjacent to each other on the axis;
a touch interface that receives a selection at the scrollable axis from the user, the selection indicating selection of the first or second customization;
a customization system that updates the rendering of the product i) when the first or second customization traverses the rendering of the product during scrolling of the axis to present the product as being customized with the first or second customizations, wherein, during scrolling of the axis, the first and second customizations do not obscure at least a portion of the rendering of the product, and ii) upon selection of the first or second customization to present the product as being customized with the first or second customization;
a plurality of templates, each template of the plurality of templates corresponding to one of the customizations in the set of customizations; and
an electronic file used to manufacture the product, the electronic file having product manufacturing details from a template of the plurality of templates corresponding to the first or second customization.

12. The system of claim 11 further comprising:
a printer that prints the first or second customization on the product based on the product manufacturing details of the electronic file.

13. The system of claim 12 wherein the printer is located remotely relative to the display device, the touch interface, and the customization system.

14. The system of claim 11 wherein:
the set of customizations is a first set of customizations;
the scrollable axis is a first scrollable axis; and
the display device presents to the user a second set of customizations of a second feature of the product on a second scrollable axis.

15. The system of claim 14 wherein:
the first scrollable axis and the second scrollable axis intersect; and
the display device positions the rendering of the product such that a center of the rendering is located at an intersection of the first scrollable axis and the second scrollable axis.

16. The system of claim 14 wherein:
the first set of customizations is a first color for a first portion of the product; and
the second set of customizations is a second color for a second portion of the product.

17. The system of claim 14 wherein:
the first set of customizations is a set of graphics, each graphic in the set of graphics being printable on a portion of the product; and
the second set of customization is one of a set of colors for a graphic selected by the user from the set of graphics or a set of fill patterns for the graphic selected.

18. The system of claim 11 wherein:
the touch interface receives textual data from the user;
the customization system updates the rendering of the product to display the textual data on a portion of the product; and
the set of customizations is one of a set of colors for the textual data, a set of fonts for the textual data, or a set of fill patterns for the textual data.

19. The system of claim 11 wherein:
the touch interface receives at least one of an adjustment of at least one of a size, an orientation, and a location on the product of the first or second customization; and
the customization system updates the rendering of the product based on the adjustment.

20. The system of claim 11 wherein the product is an article of footwear.

* * * * *